(12) United States Patent
Giuliano et al.

(10) Patent No.: US 10,541,611 B2
(45) Date of Patent: *Jan. 21, 2020

(54) POWER CONVERTER WITH CAPACITIVE ENERGY TRANSFER AND FAST DYNAMIC RESPONSE

(71) Applicant: Massachusetts Institute of Technology, Cambridge, MA (US)

(72) Inventors: David M. Giuliano, Cambridge, MA (US); David J. Perreault, Cambridge, MA (US); Robert C. N. Pilawa-Podgurski, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/146,028

(22) Filed: Sep. 28, 2018

(65) Prior Publication Data
US 2019/0044443 A1    Feb. 7, 2019

Related U.S. Application Data

(63) Continuation of application No. 15/585,676, filed on May 3, 2017, now abandoned, which is a continuation
(Continued)

(51) Int. Cl.
*H02M 3/158* (2006.01)
*H02M 3/07* (2006.01)
(Continued)

(52) U.S. Cl.
CPC ............. *H02M 3/158* (2013.01); *H02M 3/07* (2013.01); *H02M 3/155* (2013.01); *H02M 2001/007* (2013.01)

(58) Field of Classification Search
CPC ........ H02M 3/158; H02M 3/07; H02M 3/155; H02M 2001/007
See application file for complete search history.

(56) References Cited

U.S. PATENT DOCUMENTS 3,370,215 A    2/1968    Light, Jr.
3,745,437 A    7/1973    Brown
(Continued)

FOREIGN PATENT DOCUMENTS

DE    103 58 299 A1    7/2005
EP    0 513 920 A2    11/1992
(Continued)

OTHER PUBLICATIONS

U.S. Appl. No. 14/401,981, filed Nov. 18, 2014, Perreault.
(Continued)

*Primary Examiner* — Emily P Pham
(74) *Attorney, Agent, or Firm* — Daly, Crowley, Mofford & Durkee LLP

(57) ABSTRACT

A converter circuit and related technique for providing high power density power conversion includes a reconfigurable switched capacitor transformation stage coupled to a magnetic converter (or regulation) stage. The circuits and techniques achieve high performance over a wide input voltage range or a wide output voltage range. The converter can be used, for example, to power logic devices in portable battery operated devices.

11 Claims, 8 Drawing Sheets

Related U.S. Application Data of application No. 14/708,903, filed on May 11, 2015, now Pat. No. 9,667,139, which is a continuation of application No. 14/251,917, filed on Apr. 14, 2014, now Pat. No. 9,048,727, which is a continuation of application No. 13/599,037, filed on Aug. 30, 2012, now Pat. No. 8,699,248, which is a continuation of application No. 13/487,781, filed on Jun. 4, 2012, now Pat. No. 8,643,347, which is a continuation of application No. 12/437,599, filed on May 8, 2009, now Pat. No. 8,212,541.

(60) Provisional application No. 61/051,476, filed on May 8, 2008.

(51) Int. Cl.
*H02M 3/155* (2006.01)
*H02M 1/00* (2006.01)

(56) References Cited

U.S. PATENT DOCUMENTS

| | | | |
|---|---|---|---|
| 3,818,360 A | 6/1974 | Boutmy et al. |
| 4,214,174 A | 7/1980 | Dickson |
| 4,513,364 A | 4/1985 | Nilssen |
| 4,812,961 A | 3/1989 | Essaff et al. |
| 4,903,181 A | 2/1990 | Seidel |
| 5,057,986 A | 10/1991 | Henze et al. |
| 5,119,283 A | 6/1992 | Steigerwald et al. |
| 5,132,606 A | 7/1992 | Herbert |
| 5,159,539 A | 10/1992 | Koyama |
| 5,198,970 A | 3/1993 | Kawabata et al. |
| 5,268,832 A | 12/1993 | Kandatsu |
| 5,301,097 A | 4/1994 | McDaniel |
| 5,331,303 A | 7/1994 | Shiota |
| 5,402,329 A | 3/1995 | Wittenbreder, Jr. |
| 5,557,193 A | 9/1996 | Kajimoto |
| 5,661,348 A | 8/1997 | Brown |
| 5,717,581 A | 2/1998 | Canclini |
| 5,737,201 A | 4/1998 | Meynard et al. |
| 5,761,058 A | 6/1998 | Kanda et al. |
| 5,793,626 A | 8/1998 | Jiang |
| 5,801,987 A | 9/1998 | Dinh |
| 5,812,017 A | 9/1998 | Golla et al. |
| 5,831,846 A | 11/1998 | Jiang |
| 5,892,395 A | 4/1999 | Stengel et al. |
| 5,907,484 A | 5/1999 | Kowshik et al. |
| 5,956,243 A | 9/1999 | Mao |
| 5,959,565 A | 9/1999 | Taniuchi et al. |
| 5,978,283 A | 11/1999 | Hsu et al. |
| 5,982,645 A | 11/1999 | Levran et al. |
| 6,107,864 A | 8/2000 | Fukushima et al. |
| 6,133,788 A | 10/2000 | Dent |
| 6,140,807 A | 10/2000 | Vannatta et al. |
| 6,154,380 A | 11/2000 | Assow et al. |
| 6,157,253 A | 12/2000 | Sigmon et al. |
| 6,178,102 B1 | 1/2001 | Stanley |
| 6,198,645 B1 | 3/2001 | Kotowski et al. |
| 6,255,906 B1 | 7/2001 | Eidson et al. |
| 6,275,018 B1 | 8/2001 | Telefus et al. |
| 6,327,462 B1 | 12/2001 | Loke et al. |
| 6,339,538 B1 | 1/2002 | Handleman |
| 6,377,117 B2 | 4/2002 | Oskowsky et al. |
| 6,396,341 B1 | 5/2002 | Pehlke |
| 6,476,666 B1 | 11/2002 | Palusa et al. |
| 6,486,728 B2 | 11/2002 | Kleveland |
| 6,501,325 B1 | 12/2002 | Meng |
| 6,504,422 B1 | 1/2003 | Rader et al. |
| 6,507,503 B2 | 1/2003 | Norrga |
| 6,515,612 B1 | 2/2003 | Abel |
| 6,563,235 B1 | 5/2003 | McIntyre et al. |
| 6,650,552 B2 | 11/2003 | Takagi et al. |
| 6,700,803 B2 | 3/2004 | Krein |
| 6,738,277 B2 | 5/2004 | Odell |
| 6,738,432 B2 | 5/2004 | Pehlke et al. |
| 6,759,766 B2 | 7/2004 | Hiratsuka et al. |
| 6,927,441 B2 | 8/2005 | Pappalardo et al. |
| 6,934,167 B2 | 8/2005 | Jang et al. |
| 6,980,181 B2 | 12/2005 | Sudo |
| 7,072,195 B2 | 7/2006 | Xu |
| 7,091,778 B2 | 8/2006 | Gan et al. |
| 7,103,114 B1 | 9/2006 | Lapierre |
| 7,135,847 B2 | 11/2006 | Taurand |
| 7,145,382 B2 | 12/2006 | Ker et al. |
| 7,157,956 B2 | 1/2007 | Wei |
| 7,161,816 B2 | 1/2007 | Shteynberg et al. |
| 7,190,210 B2 | 3/2007 | Azrai et al. |
| 7,224,062 B2 | 5/2007 | Hsu |
| 7,236,542 B2 | 6/2007 | Matero |
| 7,239,194 B2 | 7/2007 | Azrai et al. |
| 7,250,810 B1 | 7/2007 | Tsen et al. |
| 7,269,036 B2 | 9/2007 | Deng et al. |
| 7,330,070 B2 | 2/2008 | Vaisanen |
| 7,362,251 B2 | 4/2008 | Jensen et al. |
| 7,375,992 B2 | 5/2008 | Mok et al. |
| 7,382,113 B2 | 6/2008 | Wai et al. |
| 7,382,634 B2 | 6/2008 | Buchmann |
| 7,408,330 B2 | 8/2008 | Zhao |
| 7,443,705 B2 | 10/2008 | Ito |
| 7,511,978 B2 | 3/2009 | Chen et al. |
| 7,521,914 B2 | 4/2009 | Dickerson et al. |
| 7,535,133 B2 | 5/2009 | Perreault et al. |
| 7,589,605 B2 | 9/2009 | Perreault et al. |
| 7,595,682 B2 | 9/2009 | Lin et al. |
| 7,616,467 B2 | 11/2009 | Mallwitz |
| 7,633,778 B2 | 12/2009 | Mok et al. |
| 7,696,735 B2 | 4/2010 | Oraw et al. |
| 7,705,681 B2 | 4/2010 | Ilkov |
| 7,724,551 B2 | 5/2010 | Yanagida et al. |
| 7,768,800 B2 | 8/2010 | Mazumduer et al. |
| 7,777,459 B2 | 8/2010 | Williams |
| 7,782,027 B2 | 8/2010 | Williams |
| 7,786,712 B2 | 8/2010 | Williams |
| 7,807,499 B2 | 10/2010 | Nishizawa |
| 7,812,579 B2 | 10/2010 | Williams |
| 7,889,519 B2 | 2/2011 | Perreault et al. |
| 7,907,429 B2 | 3/2011 | Ramadass et al. |
| 7,907,430 B2 | 3/2011 | Kularatna et al. |
| 7,928,705 B2 | 4/2011 | Hooijschuur et al. |
| 7,940,038 B2 | 5/2011 | Da Silva et al. |
| 7,956,572 B2 | 6/2011 | Zane et al. |
| 7,977,921 B2 | 7/2011 | Bahai et al. |
| 7,999,601 B2 | 8/2011 | Schlueter et al. |
| 8,000,117 B2 | 8/2011 | Petricek |
| 8,018,216 B2 | 9/2011 | Kakehi |
| 8,026,763 B2 | 9/2011 | Dawson et al. |
| 8,040,174 B2 | 10/2011 | Likhterov |
| 8,048,766 B2 | 11/2011 | Joly et al. |
| 8,085,524 B2 | 12/2011 | Roozeboom et al. |
| 8,111,054 B2 | 2/2012 | Yen et al. |
| 8,130,518 B2 | 3/2012 | Fishman |
| 8,159,091 B2 | 4/2012 | Yeates |
| 8,164,384 B2 | 4/2012 | Dawson et al. |
| 8,169,797 B2 | 5/2012 | Coccia et al. |
| 8,193,604 B2 | 6/2012 | Lin et al. |
| 8,212,541 B2 | 7/2012 | Perreault et al. |
| 8,276,002 B2 | 9/2012 | Dennard et al. |
| 8,339,184 B2 | 12/2012 | Kok et al. |
| 8,350,549 B2 | 1/2013 | Kitabatake |
| 8,384,467 B1 | 2/2013 | O'Keeffe et al. |
| 8,395,914 B2 | 3/2013 | Klootwijk et al. |
| 8,451,053 B2 | 5/2013 | Perreault et al. |
| 8,456,874 B2 | 6/2013 | Singer et al. |
| 8,503,203 B1 * | 8/2013 | Szczeszynski ........ H02M 3/073 307/110 |
| 8,643,347 B2 | 2/2014 | Giuliano et al. |
| 8,659,353 B2 | 2/2014 | Dawson et al. |
| 8,670,254 B2 | 3/2014 | Perreault et al. |
| 8,718,188 B2 | 5/2014 | Balteanu et al. |
| 8,729,819 B2 | 5/2014 | Zhao et al. |
| 8,824,978 B2 | 9/2014 | Briffa et al. |
| 8,829,993 B2 | 9/2014 | Briffa et al. |
| 8,830,709 B2 | 9/2014 | Perreault et al. |

(56) References Cited

U.S. PATENT DOCUMENTS

| | | |
|---|---|---|
| 8,830,710 B2 | 9/2014 | Perreault et al. |
| 8,957,727 B2 | 2/2015 | Dawson et al. |
| 9,048,727 B2 | 6/2015 | Giuliano et al. |
| 9,209,758 B2 | 12/2015 | Briffa et al. |
| 2003/0169096 A1 | 9/2003 | Hsu et al. |
| 2003/0227280 A1 | 12/2003 | Vinciarelli |
| 2004/0041620 A1 | 3/2004 | D'Angelo et al. |
| 2004/0170030 A1 | 9/2004 | Duerbaum et al. |
| 2004/0222775 A1 | 11/2004 | Muramatsu et al. |
| 2005/0007184 A1 | 1/2005 | Kamijo |
| 2005/0088865 A1 | 4/2005 | Lopez et al. |
| 2005/0207133 A1 | 9/2005 | Pavier et al. |
| 2005/0213267 A1 | 9/2005 | Azrai et al. |
| 2005/0286278 A1 | 12/2005 | Perreault et al. |
| 2007/0035977 A1 | 2/2007 | Odell |
| 2007/0066224 A1 | 3/2007 | d'Hont et al. |
| 2007/0066250 A1 | 3/2007 | Takahashi et al. |
| 2007/0069818 A1 | 3/2007 | Bhatti et al. |
| 2007/0091655 A1 | 4/2007 | Oyama et al. |
| 2007/0123184 A1 | 5/2007 | Nesimoglu et al. |
| 2007/0146020 A1 | 6/2007 | Williams |
| 2007/0146090 A1 | 6/2007 | Carey et al. |
| 2007/0159257 A1 | 7/2007 | Lee et al. |
| 2007/0171680 A1 | 7/2007 | Perreault et al. |
| 2007/0210774 A1 | 9/2007 | Kimura et al. |
| 2007/0230221 A1 | 10/2007 | Lim et al. |
| 2007/0247222 A1 | 10/2007 | Sorrells et al. |
| 2007/0247253 A1 | 10/2007 | Carey et al. |
| 2007/0281635 A1 | 12/2007 | McCallister et al. |
| 2007/0290747 A1 | 12/2007 | Traylor et al. |
| 2007/0291718 A1 | 12/2007 | Chan et al. |
| 2007/0296383 A1 | 12/2007 | Xu et al. |
| 2008/0001660 A1 | 1/2008 | Rasmussen |
| 2008/0003960 A1 | 1/2008 | Zolfaghari |
| 2008/0003962 A1 | 1/2008 | Ngai |
| 2008/0007333 A1 | 1/2008 | Lee et al. |
| 2008/0012637 A1 | 1/2008 | Aridas et al. |
| 2008/0013236 A1 | 1/2008 | Weng |
| 2008/0019459 A1 | 1/2008 | Chen et al. |
| 2008/0031023 A1 | 2/2008 | Kitagawa et al. |
| 2008/0062724 A1 | 3/2008 | Feng et al. |
| 2008/0150621 A1 | 6/2008 | Lesso et al. |
| 2008/0157732 A1 | 7/2008 | Williams |
| 2008/0157733 A1 | 7/2008 | Williams |
| 2008/0158915 A1 | 7/2008 | Williams |
| 2008/0239772 A1 | 10/2008 | Oraw et al. |
| 2009/0059630 A1 | 3/2009 | Williams |
| 2009/0072800 A1 | 3/2009 | Ramadass et al. |
| 2009/0102439 A1 | 4/2009 | Williams |
| 2009/0147554 A1 | 6/2009 | Adest et al. |
| 2009/0196082 A1 | 8/2009 | Mazumder et al. |
| 2009/0257211 A1 | 10/2009 | Kontani et al. |
| 2009/0273955 A1 | 11/2009 | Tseng et al. |
| 2009/0278520 A1 | 11/2009 | Perreault et al. |
| 2009/0302686 A1 | 12/2009 | Fishman |
| 2009/0303753 A1 | 12/2009 | Fu et al. |
| 2009/0323380 A1 | 12/2009 | Harrison |
| 2010/0073084 A1 | 3/2010 | Hur et al. |
| 2010/0085786 A1 | 4/2010 | Chiu et al. |
| 2010/0110741 A1 | 5/2010 | Lin et al. |
| 2010/0117612 A1 | 5/2010 | Klootwijk et al. |
| 2010/0140736 A1 | 6/2010 | Lin et al. |
| 2010/0142239 A1 | 6/2010 | Hopper |
| 2010/0201441 A1 | 8/2010 | Gustavsson |
| 2010/0202161 A1 | 8/2010 | Sims et al. |
| 2010/0214746 A1 | 8/2010 | Lotfi et al. |
| 2010/0244189 A1 | 9/2010 | Klootwijk et al. |
| 2010/0244585 A1 | 9/2010 | Tan et al. |
| 2010/0308751 A1 | 12/2010 | Nerone |
| 2011/0001542 A1 | 1/2011 | Ranta et al. |
| 2011/0001642 A1 | 1/2011 | Ranta et al. |
| 2011/0148518 A1 | 6/2011 | Lejon et al. |
| 2011/0163414 A1 | 7/2011 | Lin et al. |
| 2011/0181128 A1 | 7/2011 | Perreault et al. |
| 2012/0043818 A1 | 2/2012 | Stratakos et al. |
| 2012/0146177 A1 | 6/2012 | Choi et al. |
| 2012/0153907 A1 | 6/2012 | Carobolante et al. |
| 2012/0176195 A1 | 7/2012 | Dawson et al. |
| 2012/0313602 A1 | 12/2012 | Perreault et al. |
| 2012/0326684 A1 | 12/2012 | Perreault et al. |
| 2013/0049714 A1 | 2/2013 | Chiu |
| 2013/0094157 A1 | 4/2013 | Giuliano et al. |
| 2013/0154600 A1 | 6/2013 | Giuliano et al. |
| 2013/0187612 A1* | 7/2013 | Aiura ............... H01M 10/425 320/118 |
| 2013/0241625 A1 | 9/2013 | Perreault et al. |
| 2013/0343106 A1 | 12/2013 | Perreault et al. |
| 2013/0343107 A1 | 12/2013 | Perreault |
| 2014/0118065 A1 | 5/2014 | Briffa et al. |
| 2014/0118072 A1 | 5/2014 | Briffa et al. |
| 2014/0120854 A1 | 5/2014 | Briffa et al. |
| 2014/0167513 A1 | 6/2014 | Chang et al. |
| 2014/0225581 A1 | 8/2014 | Giuliano et al. |
| 2014/0226378 A1 | 8/2014 | Perreault |
| 2014/0306648 A1* | 10/2014 | Le .................. H02M 3/156 320/107 |
| 2014/0306673 A1 | 10/2014 | Le et al. |
| 2014/0313781 A1 | 10/2014 | Perreault et al. |
| 2014/0335805 A1 | 11/2014 | Briffa et al. |
| 2014/0339918 A1 | 11/2014 | Perreault |
| 2014/0355322 A1 | 12/2014 | Perreault et al. |
| 2015/0022173 A1 | 1/2015 | Le et al. |
| 2015/0023063 A1 | 1/2015 | Perreault et al. |
| 2015/0084701 A1 | 3/2015 | Perreault et al. |
| 2015/0097538 A1 | 4/2015 | Le et al. |
| 2015/0280553 A1 | 10/2015 | Giuliano et al. |
| 2015/0295497 A1 | 10/2015 | Perreault et al. |
| 2016/0254754 A1 | 9/2016 | Perreault et al. |
| 2017/0237351 A1 | 8/2017 | Giuliano et al. |

FOREIGN PATENT DOCUMENTS

| | | |
|---|---|---|
| EP | 1 750 366 A2 | 2/2007 |
| EP | 1 750 366 A3 | 2/2007 |
| JP | H10327573 A | 12/1998 |
| JP | H11235053 A | 8/1999 |
| JP | 2002-62858 | 2/2002 |
| JP | 2010/045943 A | 2/2010 |
| WO | WO 2006/093600 A2 | 9/2006 |
| WO | WO 2007/136919 A2 | 11/2007 |
| WO | WO 2007/136919 A3 | 11/2007 |
| WO | WO 2009/112900 A1 | 9/2009 |
| WO | WO2012151466 A2 | 11/2012 |
| WO | WO 2013/059446 A1 | 4/2013 |
| WO | WO 2013/086445 A1 | 6/2013 |
| WO | WO 2013/096416 A1 | 6/2013 |
| WO | WO 2014/070998 A1 | 5/2014 |
| WO | WO 2014/168911 A1 | 10/2014 |

OTHER PUBLICATIONS

U.S. Appl. No. 14/416,654, filed Jan. 23, 2015, Perreault et al.
U.S. Appl. No. 14/619,737, filed Feb. 11, 2015, Perreault et al.
U.S. Appl. No. 14/666,965, filed Mar. 24, 2015, Briffa et al.
Abutbul, et al.; "Step-Up Switching-Mode Converter with High Voltage Gain Using a Switched-Capacitor Circuit;" IEEE Transactions on Circuits and Systems—1: Fundamental Theory and Applications; vol. 50, No. 8; Aug. 2003; pp. 1098-1102.
Axelrod, et al.; "Single-Switch Single-Stage Switched-Capacitor Buck Converter;" 4$^{th}$ Nordic Workshop on Power and Industrial Electronics; Jun. 2004; 5 pages.
Giuliano, et al.; "Architectures and Topologies for Power Delivery;" Biannual Review of MIT Center for Integrated Circuits; Power Point Presentation; May 9, 2007; 17 slides.
Ma, et al.; "Design and Optimization on Dynamic Power Systems for Self-Powered Integrated Wireless Sensing Nodes;" Low Power Electronics and Design, 2005; ISLPED 05; Proceedings of the 2005 International Symposium; Aug. 8-10, 2005; pp. 303-306.
Maxim; Triple-Output TFT-LCD DC-DC Converters; MAX1748/ MAX8726; 19/3430; Rev 0; Oct. 2004; pp. 1-16.
Ottman, et al.; "Optimized Piezoelectric Energy Harvesting Circuit Using Step-Down Converter in Discontinuous Conduction Mode;"

(56) References Cited

OTHER PUBLICATIONS

Power Electronics Specialists Conference, 2002; pesc 02. 2002; IEEE 33rd Annual; vol. 4; Jun. 23-27, 2002; pp. 1988-1994.
Sun, et al.; "High Power Density, High Efficiency System Two-Stage Power Architecture for Laptop Computers;" 37th IEEE Power Electronics Specialists Conference apros; 06; Jun. 18, 2006; 7 pages.
Wood, et al.; "Design, Fabrication and Initial Results of a 2g Autonomous Glider;" Industrial Electronics Society, IECON 2005; 31st Annual Conference of IEEE: Nov. 6-10, 2005; pp. 1870-1877.
Xu, et al.; Voltage Divider and its Application in the Two-stage Power Architecture; Applied Power Electronics Conference and Exposition 2006; APEC 06; Twenty-First Annual IEEE: Mar. 19-23, 2006; pp. 499-505.
U.S. Appl. No. 12/437,599, filed May 8, 2009.
U.S. Appl. No. 13/487,781, filed Jun. 4, 2012.
U.S. Appl. No. 13/599,037, filed Aug. 30, 2012.
U.S. Appl. No. 13/251,917, filed Apr. 14, 2014.
Alspach; "Solar Power Inverter Manufacturers Get Day in Sun;" Boston Business Journal; Oct. 29, 2010; 1 page.
Denning; "Solar Market Is Risking Sunstroke;" Wall Street Journal; Dec. 11-12, 2010, 1 page.
Pierquet, et al.; "A Single-Phase Photovoltaic Inverter Topology with a Series-Connected Power Buffer;" (ECCE), IEEE, Sep. 2010, pp. 1-9.
Trubitsyn, et al.; High-Efficiency Inverter for Photovoltaic Applications; (ECCE), IEEE, Sep. 2010, pp. 1-9.
Bush, et al.; "A Single-Phase Current Source Solar Inverter with Reduced-Size DC Link;" Energy Conversion Congress and Exposition; IEEE; Sep. 20, 2009; 6 Pages.
Krein, et al.; "Cost-Effective Hundred-Year Life for Single-Phase Inverters and Rectifiers in Solar and LED Lighting Applications Based on Minimum Capacitance Requirements and a Ripple Power Port;" Applied Power Electronics Conference and Exposition; IEEE; Feb. 15, 2009; 6 Pages.
Li; "A Review of the Single Phase Photovoltaic Module Integrated Converter Topologies With Three Different DC Link Configurations;" IEEE Transactions on Power Electronics; vol. 23; No. 3; May 2008; 14 Pages.
Invitation to Pay Additional Fees dated Jul. 5, 2011 for International Application No. PCT/US2011/022056; 3 Pages.
Partial Search Report of the ISA dated Jul. 5, 2011 for International Application No. PCT/US2011/022056; 6 Pages.
PCT Search Report and Written Opinion dated Sep. 23, 2011 for International Application No. PCT/US2011/022056; 15 Pages.
PCT International Preliminary Report on Patentability dated Aug. 2, 2012 for International Application No. PCT/US2011/022056; 9 Pages.
Ozpineci, et al.; "Cycloconverters;" An on-line tutorial for the IEEE Power Electronics Society; http://pels.org/Comm/Education/Tutorials/tutorials.htm; 2001: 17 Pages.
Perreault et al.; "Multi-Phase Grid Interface;" for U.S. Appl. No. 13/795,633, filed Mar. 12, 2013; 41 Pages.
PCT International Search Report and Written Opinion dated May 13, 2013 for International Application No. PCT/US2013/030383; 13 Pages.
PCT International Preliminary Report and Written Opinion dated May 26, 2011 for International Application No. PCT/US2009/063821; 9 Pages.
Amendment to Office Action dated Apr. 7, 2011 for U.S. Appl. No. 12/680,048; 7 Pages.
PCT Search Report and Written Opinion dated Apr. 13, 2010 for International Application No. PCT/US2009/063821; 16 Pages.
PCT Invitation to Pay Additional Fees dated Feb. 9, 2010 for International Application No. PCT/US2009/063821; 44 Pages.
Xuejun Zhang, et al., "Analysis of Power Recycling Techniques for RF and Microwave Outphasing Power Amplifiers", IEEE Transactions on Circuits and Systems—II: Analog and Digital Signal Porcessing, vol. 49, No. 5, May 2002, 9 Pages.
Sungwon Chung, et al., "Asymmetric Multilevel Outphasing Architecture for Multi-Standard Transmitters", 2009 IEEE Radio Frequency Integrated Circuits Symposium, 4 Pages.
D. Diaz, et al., "Comparison of Two Different Cell Topologies for a Multilevel Power Supply to Achieve High Efficiency Envelope Amplifier", IEEE , 2009, 6 Pages.
M. Rodriguez, et al., "Multilevel Converter for Envelope Tracking in RF Power Amplifiers", IEEE, 2009, 8 Pages.
Yuan-Jyue Chen, et al., "Multilevel LINC System Design for Wireless Transmitters", IEEE, 2007, 4 Pages.
Jinsung Choi, et al., "A $\Delta \Sigma$—Digitized Polar RF Transmitter", IEEE Transactions on Microwave Theory and Techniques, vol. 55, No. 12, Dec. 2007, 12 Pages.
Kai-Yuan Jheng, et. al., "Multilevel LINC System Design for Power Efficiency Enhancement", IEEE, 2007, 4 Pages.
Kevin Tom, et al., "Load-Pull Analysis of Outphasing Class-E Power Amplifier", The 2nd International Conference on Wireless Broadband and Ultra Wideband Communications (AusWireless 2007), IEEE, 2007, 4 Pages.
Yehui Han, et al., "Resistance Compression Networks for Radio-Frequency Power Conversion", IEEE Transactions on Power Electronics, vol. 22, No. 1, Jan. 2007, 13 Pages.
Surya Musunuri, et al., "Improvement of Light-Load Efficiency Using Width-Switching Scheme for CMOS Transistors", IEEE Power Electronics Letters, vol. 3, No. 3, Sep. 2005, 6 Pages.
Frederick H. Raab, et al., "RF and Microwave Power Amplifier and Transmitter Technologies—Part 3", Sep. 2003, High Frequency Electronics, Summit Technical Media, LLC., 9 Pages.
Petri Eloranta, et al., "A Multimode Transmitter in 0.13 $\mu m$ CMOS Using Direct-Digital RF Modulator", IEEE Journal of Solid-State Circuits, vol. 42, No. 12, Dec. 2007, 11 Pages.
Hur, et al., "Highly Efficient and Linear Level Shifting Digital LINC Transmitter with a Phase Offset Cancellation;" IEEE; Jul. 2009; 4 Pages.
Hur, et al., "A Multi-Level and Multi-Band Class-D CMOS Power Amplifier for the LINC System in the Cognitive Radio Application;" IEEE; Feb. 2010, 3 Pages.
Hur, et al., "Highly Efficient Uneven Multi-Level LINC Transmitter;" Electronics Letter; vol. 45; No. 16; Jul. 30, 2009; 2 Pages.
U.S. Appl. No. 12/615,696.
U.S. Appl. No. 13/106,195.
U.S. Appl. No. 13/423,909.
U.S. Appl. No. 13/798,738.
U.S. Appl. No. 13/011,317.
Araghchini, et al.; "A Technology Overview of the PowerChip Development Program;" IEEE Transactions on Power Electronics; vol. 28; No. 9; Sep. 2013; 20 Pages.
Chen, et al.; "Stacked Switched Capacitor Energy Buffer Architecture;" IEEE Transactions on Power Electronics; Vo. 28; No. 11; Nov. 2013; 13 Pages.
Huber, et al.; "Design-Oriented Analysis and Performance Evaluation of Buck PFC Front End;" IEEE Transactions on Power Electronics; vol. 25; No. 1; Jan. 2010; 10 Pages.
Kjaer, et al.; "Design Optimization of a Single Phase Inverter for Photovoltaic Applications;" Power Electronics Specialist Conference; 2003; PESC 03; IEEE 34th Annual; vol. 3; Jun. 15-19, 2003; 8 Pages.
Krein, et al.; "Cost-Effective Hundred-Year Life for Single Phase Inverters and Rectifiers in Solar and LED Lighting Applications Based on Minimum Capacitance Requirements and a Ripple Power Port;" Applied Power Electronics Conference and Exposition; APEC 2009; Twenty-Fourth Annual IEEE; Feb. 15-19, 2009; 6 Pages.
Kyritsis, et al.; "A Novel Parallel Active Filter for Current Pulsation Smoothing on Single Stage Grid-Connected AC-PV Modules;" Power Electronics and Applications; 2007 European Conference on; Sep. 2-5, 2007; 10 Pages.
Kyritsis, et al.; "Enhanced Current Pulsation Smoothing Parallel Active Filter for Single Stage Grid-Connected AC-PV Modules;" International Power Electronics and Motion Control Conference 2008; EPE-PEMC; 2008; 13th; 6 Pages.
Garcia, et al.; "Single Phase Power Factor Correction: A Survey;" IEEE Transactions on Power Electronics; vol. 18; No. 3; May 2003; 7 Pages.

(56) References Cited

OTHER PUBLICATIONS

Lam, et al.; "A Novel High-Power-Factor Single-Switch Electronic Ballast;" IEEE Transactions on Industry Applications; vol. 46; No. 6; Nov./Dec. 2010; 10 Pages.

Lim, et al.; "Power Conversion Architecture for Grid Interface at High Switching Frequency;" Applied Power Electronics Conference and Exposition (APEC); 2014 Twenty-Ninth Annual IEEE: 2014; 8 Pages.

Lim, et al.; "Two-Stage Power Conversion Architecture for an LED Driver Circuit;" Applied Power Electronics Conference and Exposition (APEC); 2013; Twenty-Eighth Annual IEEE; Mar. 17-21, 2013; 8 Pages.

Perreault, et al.; "Opportunities and Challenges in Very High Frequency Power Conversion;" Applied Power Electronics Conference and Exposition; 2009; APEC 2009; Twenty-Fourth Annual IEEE: Feb. 15-19, 2009; 14 Pages.

Pierquet, et al.; "A Single-Phase Photovoltaic Inverter Topology With a Series-Connected Energy Buffer;" IEEE Transactions on Power Electronics; vol. 28; No. 10; Oct. 2013; 9 Pages.

Pilawa-Podgurski; et al.; "Merged Two-Stage Power Converter With Soft Charging Switched-Capacitor Stage in 180 nm CMOS;" IEEE Journal of Solid-State Circuits; vol. 47; No. 7; Jul. 2012; 11 Pages.

Schlecht, et al.; "Active Power Factor Correction for Switching Power Supplies;" IEEE Transactions on Power Electronics; vol. PE-2; No. 4; Oct. 1987; 9 Pages.

Seeman, et al.; "Analysis and Optimization of Switched-Capacitor DC-DC Converters;" IEEE Transactions on Power Electronics; vol. 23; No. 2; Mar. 2008; 11 Pages.

Shimizu, et al.; "Flyback-Type Single-Phase Utility Interactive Inverter With Power Pulsation Decoupling on the DC Input for an AC Photovoltaic Module System;" IEEE Transactions on Power Electronics; vol. 21; No. 5; Sep. 2006; 9 Pages.

Singh, et al,; "A Review of Single-Phase Improved Power Quality AX-DC Converters;" IEEE Transactions on Industrial Electronics; vol. 50; No. 5; Oct. 2003; 20 Pages.

Keogh; Power Factor Correction Using the Buck Topology—Efficient Benefits and Practical Design Considerations; Texas Instruments; Reproduced from Texas Instruments Power Supply Design Seminar; SEM1900; Topic 4; TI Literature No. SLUP264; 2010; 36 Pages.

Tse, et al.; "A Family of PFC Voltage Regulator Configurations with Reduced Redundant Power Processing; " IEEE Transactions on Power Electronics; vol. 16; No. 6; Nov. 2001; 9 Pages.

Vorperian; "Quasi-Square-Wave Converters: Topologies and Analysis;" IEEE Transactions on Power Electronics; vol. 3; No. 2; Apr. l1988; 9 Pages.

Wu, et al.; Design Considerations of Soft-Switched Buck PFC Converter with Constant On-Time (COT) Control; IEEE Transactions on Power Electronics; vol. 26; No. 11; Nov. 2011; 9 Pages.

PCT International Search Report and Written Opinion dated Aug. 28, 2014 for International Application No. PCT/US2014/033267; 10 Pages.

U.S. Appl. No. 14/758,033.

Zhang et al., "Single-Stage Input-Current-Shaping Technique with Voltage-Doubler-Rectifier Front End;" Proceedings of the IEEE Transactions on Power Electronics, vol. 16, No. 1; Jan. 2001; 9 Pages.

U.S. Appl. No. 14/791,685.

Han, et al.; "A New Approach to Reducing Output Ripple in Switched-Capacitor-Based Step-Down DC-DC Converters;" IEEE Transactions on Power Electronics; vol. 21; No. 6; Nov. 2006; 8 pages.

Lei, et al.; "Analysis of Switched-Capacitor DC-DC Converters in Soft-Charging Operation;" 14th IEEE Workshop on Control and Modeling for Power Electronics; Jun. 23, 2013; 7 pages.

Linear Technology Data Sheet for Part LTC3402; "2A, 3MHz Micropower Synchronous Boost Converter;" 2000; 16 pages.

Makowski, et al; "Performance Limits of Switched-Capacitor DC-DC Converters;" IEEE PESC'95; 26th Annual Power Electronics Specialists Conference; vol. 2; Jul. 1995; 7 pages.

Meynard, et al.; "Multi-Level Conversion: High Voltage Choppers and Voltage-Source Inverters;" 23rd Annual IEEE Power Electronics Specialists Conference; Jan. 1992; 7 pages.

Middlebrook; "Transformerless DC-to-DC Converters with Large Conversion Ratios;" IEEE Transactions on Power Electronics; vol. 3; No. 4; Oct. 1988; 5 pages.

Ng; "Switched Capacitor DC-DC Converter: Superior Where the Buck Converter Has Dominated;" PhD Thesis, UC Berkeley; Aug. 17, 2011; 138 pages.

Pilawa-Podgurski, et al.; "Merged Two-Stage Power Converter Architecture with Soft Charging Switched-Capacitor Energy Transfer;" 2008 IEEE Power Electronics Specialists Conference; Jun. 15-19, 2008; 8 pages.

Texas Instruments Data Sheet for Part TPS54310; "3-V to 6-V Input, 3-A Output Synchronous-Buck PWM Switcher with Integrated FETs (SWIFT);" dated Jan. 2005; 19 pages.

Umeno, et al.; "A New Approach to Low Ripple-Noise Switching Converters on the Basis of Switched-Capacitor Converters;" IEEE International Symposium on Circuits and Systems; Jun. 11-14, 1991; 4 pages.

U.S. Appl. No. 14/934,760, filed Nov. 6, 2015, Briffa, et al.
U.S. Appl. No. 14/920,031, filed Oct. 22, 2015, Briffa, et al.
U.S. Appl. No. 14/837,616, filed Aug. 27, 2015, Briffa, et al.
U.S. Appl. No. 14/823,220, filed Aug. 11, 2015, Barton, et al.
U.S. Appl. No. 14/758,033, filed Jun. 26, 2015, Perreault, et al.
U.S. Appl. No. 14/791,685, filed Jul. 6, 2015, Perreault, et al.
PCT International Preliminary Report on Patentability of the ISA for PCT/US2015/039197 dated Jan. 12, 2017; 7 pages.
PCT International Preliminary Report on Patentability of the ISA for PCT/US2014/033267 dated Oct. 22, 2015; 9 pages.
Office Action dated Dec. 16, 2016 for U.S. Appl. No. 14/791,685; 34 pages.
Office Action dated Oct. 3, 2016 for U.S. Appl. No. 14/758,033; 28 pages.
Response to Oct. 3, 2016 Office Action for U.S. Appl. No. 14/758,033, filed Jan. 3, 2017; 15 pages.
PCT International Search Report and Written Opinion dated Sep. 21, 2015 corresponding to International Application No. PCT/US2015/039197; 8 Pages.
Notice of Allowance for U.S. Appl. No. 14/758,033 dated Apr. 11, 2017; 13 pages.
Notice of Allowance for U.S. Appl. No. 14/708,903 dated Feb. 23, 2017; 20 pages.
Office Action dated Jul. 1, 2016 for U.S. Appl. No. 14/708,903; 29 pages.
Response to Jul. 1, 2016 Office Action for U.S. Appl. No. 14/708,903, filed Jan. 3, 2017; 10 pages.
Response to Dec. 16, 2016 Office Action for U.S. Appl. No. 14/791,685, filed Mar. 9, 2017; 6 pages.
Office Action dated Jun. 15, 2017 from U.S. Appl. No. 14/791,685; 20 Pages.
Response to the Office Action dated Jun. 15, 2017 from U.S. Appl. No. 14/791,685, filed Oct. 20, 2017; 7 Pages.
Final Office Action dated Jan. 12, 2018 from U.S. Appl. No. 14/791,685; 15 Pages.
Response to U.S. Non-Final Office Action dated Jan. 12, 2018 for U.S. Appl. No. 14/791,685, filed Apr. 10, 2018; 8 pages.
Notice of Allowance dated May 10, 2018 for U.S. Appl. No. 14/791,685; 8 pages.

* cited by examiner

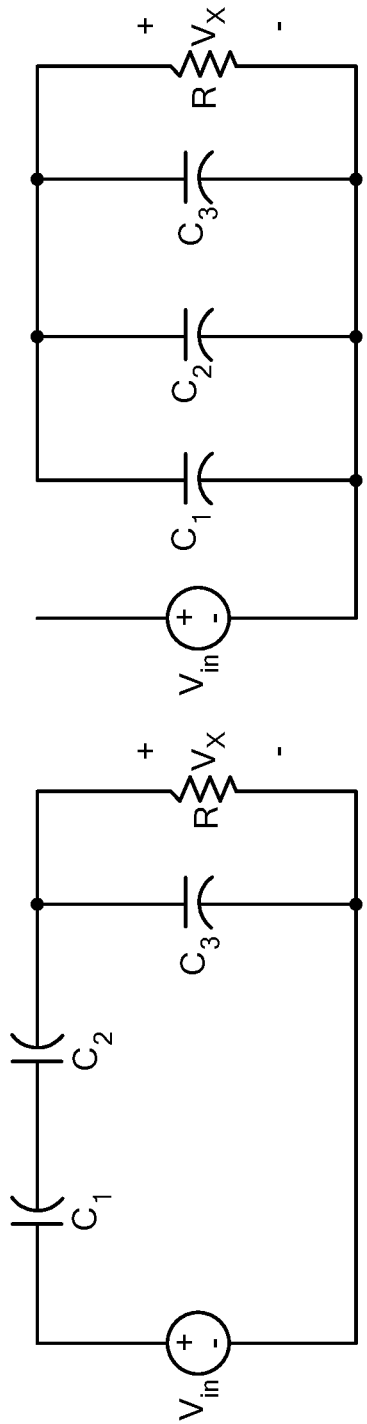
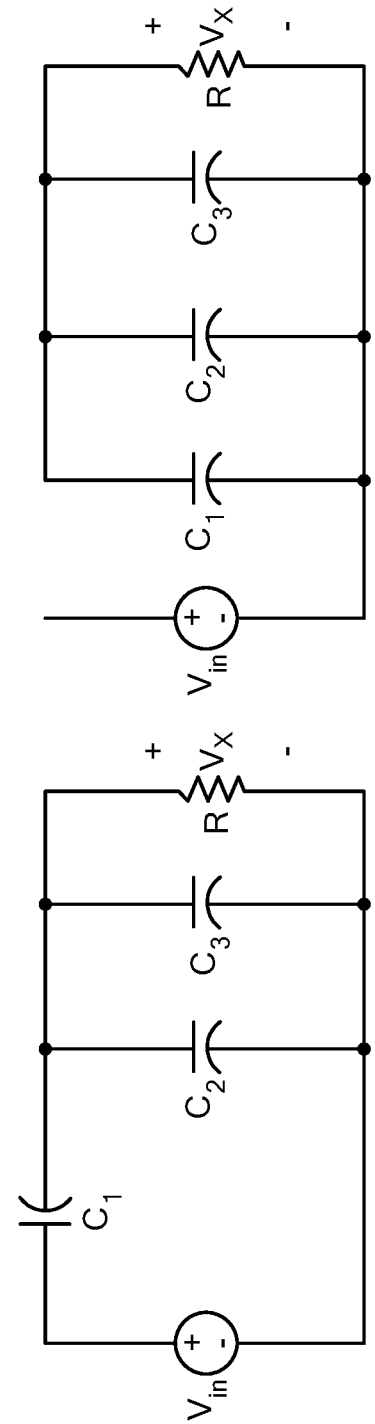
*FIG. 3A*  *FIG. 3B*

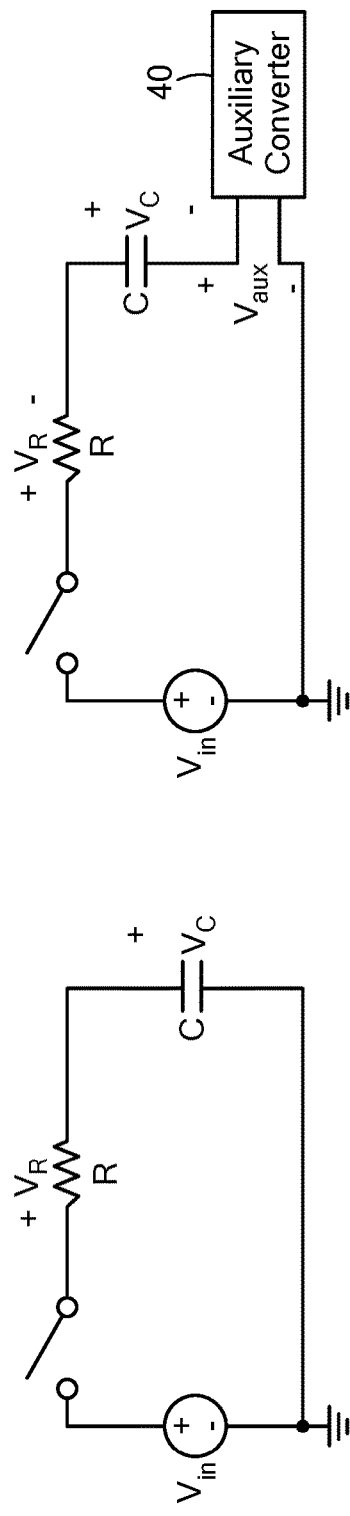
FIG. 5
FIG. 5A
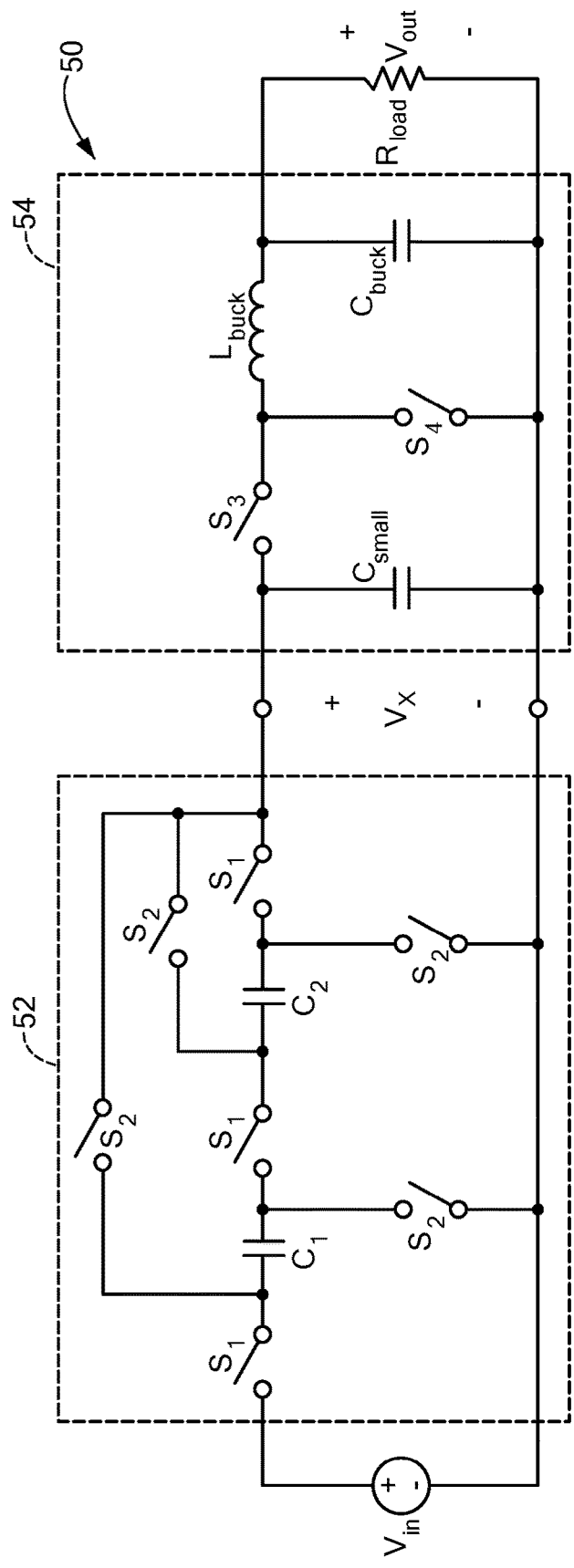
FIG. 6

POWER CONVERTER WITH CAPACITIVE ENERGY TRANSFER AND FAST DYNAMIC RESPONSE

CROSS REFERENCE TO RELATED APPLICATION

This application is a continuation of U.S. application Ser. No. 15/585,676, filed May 3, 2017, which is a continuation of Ser. No. 14/708,903, filed May 11, 2015 now U.S. Pat. No. 9,667,139, which is a continuation of U.S. application Ser. No. 14/251,917 filed Apr. 14, 2014 now U.S. Pat. No. 9,048,727, which is a continuation of U.S. application Ser. No. 13/599,037 filed Aug. 30, 2012 now U.S. Pat. No. 8,699,428, which is a continuation of U.S. application Ser. No. 13/487,781 filed Jun. 4, 2012 now U.S. Pat. No. 8,643,347, which is a continuation of application Ser. No. 12/437,599 filed May 8, 2009 now U.S. Pat. No. 8,212,541, which claims the benefit of U.S. Provisional Application No. 61/051,476 filed May 8, 2008 under 35 U.S.C. § 119(e) all of which applications are hereby incorporated herein by reference in their entireties.

GOVERNMENT RIGHTS

This invention was made with Government support under Grant No. SC001-0000000124 awarded by the Department of Defense. The Government has certain rights in this invention.

FIELD OF THE INVENTION

The circuits and techniques described herein relate generally to power converters and more particularly to power converters having a capacitive energy transfer and a fast dynamic response.

BACKGROUND OF THE INVENTION

The advent of portable electronics and low-voltage digital circuitry has resulted in a need for improved DC-DC converters. DC-DC converters that can provide a low voltage output (<2 V) regulated at high bandwidth, while drawing energy from a higher, wide-ranging input voltage (e.g., typically about a 2:1 range) are particularly useful for supplying battery-powered portable electronics. The size, cost, and performance advantages of integration make it desirable to integrate as much of the DC-DC converter as possible, including control circuits, power switches, and even passive components. Moreover, it is often desirable, if possible, to integrate the power converter or portions thereof with the load electronics.

One common approach is the use of a switched-mode power converter in which energy is transferred from the converter input to output with the help of intermediate energy storage in the magnetic field of an inductor or transformer. Such magnetics based designs include synchronous buck converters, interleaved synchronous buck converters, and three-level buck converters. Designs of this type can efficiently provide a regulated output from a variable input voltage with high-bandwidth control of the output.

For magnetics-based designs operating at low, narrow-range input voltages, it is possible to achieve extremely high switching frequencies (up to hundreds of Megahertz), along with correspondingly high control bandwidths and small passive components (e.g., inductors and capacitors). It also becomes possible to integrate portions of the converter with a microprocessor load in some cases. These opportunities arise from the ability to use fast, low-voltage, process-compatible transistors in the power converter. At higher input voltages and wider input voltage ranges, much lower switching frequencies (on the order of a few MHz and below) are the norm, due to the need to use slow extended-voltage transistors (on die) or discrete high-voltage transistors. This results in much lower control bandwidth, and large, bulky passive components (especially magnetics) which are not suitable for integration or co-packaging with the devices.

Another conversion approach that has received a lot of attention for low-voltage electronics is the use of switched-capacitor (SC) based DC-DC converters. This family of converters is well-suited for integration and/or co-packaging passive components with semiconductor devices, because they do not require any magnetic devices (inductors or transformers). An SC circuit includes of a network of switches and capacitors, where the switches are turned on and off periodically to cycle the network through different topological states. Depending upon the topology of the network and the number of switches and capacitors, efficient step-up or step-down power conversion can be achieved at different conversion ratios. An example of a step-down SC topology is shown in FIG. 1, which has an ideal conversion ratio $M=V_o/V_i=2$. When switches $S_{A1}$ and $S_{A2}$ are closed, the capacitors are charged in series as illustrated in FIG. 1A, and when switches $S_{B1}$ and $S_{B2}$ are closed, the capacitors are discharged in parallel as illustrated in FIG. 1B.

SC DC-DC converters have been described in prior art literature for various conversion ratios and applications, and the technology has been commercialized. These types of converters have found widespread use in low-power battery-operated applications, thanks to their small physical size and excellent light-load operation.

There are, however, certain limitations of the switched-capacitor DC-DC converters that have prohibited their widespread use. Chief among these is the relatively poor output voltage regulation in the presence of varying input voltage or load. The efficiency of switched capacitor converters drops quickly as the conversion ratio moves away from the ideal (rational) ratio of a given topology and operating mode. In fact, in many topologies the output voltage can only be regulated for a narrow range of input voltages while maintaining an acceptable conversion. Another disadvantage of early SC converters is discontinuous input current which has been addressed in some prior art approaches. These new techniques, however, still suffer from the same degradation of efficiency with improved regulation as previous designs.

One means that has been used to partially address the limitations of switched-capacitor converters is to cascade a switched capacitor converter having a fixed step-down ratio with a linear regulator or with a low-frequency switching power converter having a wide input voltage range to provide efficient regulation of the output. Another approach that has been employed is to use a switched-capacitor topology that can provide efficient conversion for multiple specific conversion ratios (under different operating modes) and select the operating mode that gives the output voltage that is closest to the desired voltage for any given input voltage. None of these approaches, however, are entirely satisfactory in achieving the desired levels of performance and integration.

A challenge, then, is to achieve the small size and ease of integration often associated with SC-based power converters while maintaining the high-bandwidth output regulation and high efficiency over a wide input voltage range associated with magnetics-based designs.

SUMMARY OF THE INVENTION

A converter circuit and related technique for providing high power density power conversion includes a reconfigurable switched capacitor transformation stage coupled to a magnetic converter (or regulation) stage. One objective of the circuits and techniques described herein is to provide high power density power conversion circuits which convert an input voltage to an output voltage. In some cases, the circuit converts input voltages to output voltages which are lower than the input voltages and with a fast transient response. In some cases, the circuits and techniques can achieve high performance over a relatively wide input voltage range. This type of converter can be used to power logic devices in portable battery operated applications, for example, which often experience wide input voltage ranges. In other cases it may be desirable to operate the power converter circuit so as to provide a relatively wide range of output voltages. This type of converter could be used to power digital circuits with dynamic voltage scaling, or for supplying power to polar RF power amplifiers, for example, where wide output voltage ranges are commonly required.

Conventional (e.g. magnetic-based) power converters must typically employ semiconductor switches that are rated for voltages similar in size to the input voltage. These relatively high-voltage blocking devices are inherently slower than lower-voltage devices, and suffer from a higher on-state resistance or larger gate capacitance which both reduce overall efficiency. It would thus be desirable to have a converter that provides high efficiency and fast regulation of the output over a wide input voltage range. Such a converter that combines the strengths of the SC techniques (ease of integration, light-load performance) with the high efficiency and good regulation of conventional switched-mode power converters would be a significant improvement over conventional designs.

In accordance with the circuits and techniques described herein, a power converter circuit includes a reconfigurable switched capacitor transformation stage adapted to accept an input voltage at input terminals thereof and provide power conversion at multiple distinct conversion ratios and provide an intermediate output voltage (or more simply, an intermediate voltage) at output terminals thereof wherein the transformation stage is controlled as a function of input voltage such that the intermediate voltage is smaller than the input voltage and varies over a much smaller range (ratio) than the input voltage. The power converter circuit further includes a regulation stage coupled to receive the intermediate output voltage provided by the reconfigurable switched capacitor transformation stage and to provide an output voltage at a pair of regulation stage output terminals.

With this particular arrangement, a reconfigurable switched capacitor converter which can provide efficient power conversion at multiple distinct conversion ratios is provided. By providing the transformation stage as a reconfigurable switched capacitor converter with multiple transformation ratios, the intermediate voltage provided to the regulation stage is smaller than the input voltage and varies over a much smaller range (ratio) than the input voltage. Thus, the regulation stage may operate as a low voltage regulation stage capable of relatively high switching frequencies. Thus a converter able to accept a relatively large input voltage range and provide a relatively large output current range is provided. The transformation stage provides power conversion at multiple distinct conversion (or transformation) ratios as a function of input voltage. For example, the conversion ratio of the transformation stage may be selected from among the allowed set of conversion ratios to keep the intermediate voltage as close to a desired reference voltage or as large as possible below some specified voltage. In some cases, the transformation ratio of the transformation stage may also be selected based on a desired or actual system output voltage. For example, the reference voltage for the intermediate voltage (at the output of the transformation stage) may be set based on the desired output system voltage. In these designs, the conversion (i.e. the transformation) ratios are provided as a function of input voltage such that an intermediate voltage provided at an output of the transformation stage varies over a range of voltages which is smaller (ratio) than the range of voltages over which the input voltage varies.

In another aspect of the concepts described herein, by providing the transformation stage as a reconfigurable switched capacitor converter with multiple transformation ratios, the converter can better supply a range of output voltages while maintaining high-efficiency operation. In some cases, the range of output voltages may be narrower than the input voltage range while in other cases the range of output voltages may be wider than the input voltage range. The transformation stage provides power conversion at multiple distinct conversion (or transformation) ratios as a function of the desired or actual output voltage. For example, the conversion ratio of the transformation stage may be selected from among an allowed or available set of conversion ratios to maintain an intermediate voltage (e.g. a voltage or range of voltages provided at the output of the transformation stage and at the input of the regulation stage) as close to a desired factor more than the output voltage (e.g., twice the desired output voltage) while not having the intermediate voltage exceed an allowed voltage limit or range on the input of the regulation stage. In this manner, the regulation stage can operate over a voltage conversion ratio range that is narrower than the range over which the desired output voltage varies, enabling better design of the regulation stage. In some cases, the transformation ratio of the transformation stage may also be selected based upon the system input voltage. In these designs, the conversion (i.e. the transformation) ratios of the transformation stage are provided as a function of the output voltage or output voltage reference such that an intermediate voltage provided at an output of the transformation stage varies over a range of voltages which is smaller (ratio) than the range of voltages over which the desired output voltage varies. Thus, while the circuit architecture described herein can be used in applications where it is necessary to handle a wide-range-input voltage, the circuit architecture described herein is also valuable for handling wide-range-outputs. Modern digital electronics often operate dynamically over a range of output voltages, and thus it may be desirable to provide a single converter to handle a range of desired output voltages.

Thus, a controller for providing control signals to switches in one or both transformation and regulation stages can utilize either or all of an input voltage, an output voltage and an intermediate voltage to determine what control signals to provide to switching elements within transformation or regulation stages and thus control the operation of the transformation and regulation stages.

In another aspect, the transformation stage and regulation stage each include two or more switches. The switches in the regulation stage are selected to operate at a switching frequency which is higher than the switching frequency of the switches in said transformation stage. This benefits the efficiency, power density and control bandwidth of the converter. For a given switching frequency at small size scales, the power density of a switched capacitor converter can be much higher than that of a magnetic converter. Moreover, a (low-voltage) magnetic converter stage can be efficiently switched at a much higher frequency than a (high-voltage) switched capacitor converter stage. Thus, operating the SC transformation stage at low frequency and operating the magnetic regulation stage at high frequency provides the best combination of system efficiency and power density. Moreover, as the switching frequency of the regulation stage sets the overall control bandwidth, increased frequency of the regulation stage as compared to the transformation stage enables provision of fast transient performance while maintaining high efficiency.

In accordance with a further aspect of the circuits and techniques described herein, a power converter circuit includes a switched capacitor circuit coupled to an auxiliary high-frequency converter wherein the high-frequency switching converter switches at a switching frequency higher than that of said switched-capacitor circuit and recovers energy normally dissipated when charging capacitors of said switched capacitor circuit.

With this particular arrangement, a switched capacitor converter which can provide efficient power conversion at is provided. This switched capacitor converter may provide efficient conversion at one conversion ratio or in other designs at multiple distinct conversion ratios. The high-frequency switching converter runs at a switching frequency far higher than that of the switched-capacitor circuit and recovers the energy that is normally dissipated when charging and/or discharging the capacitors. The high-frequency switched converter can also provide high-bandwidth regulation of the converter system output. The circuit can be configured such that the difference between the input voltage and the sum of the charging capacitor voltages appears across the input terminals of the fast switching converter. Because this voltage is substantially lower than the switched-capacitor circuit input voltage, the auxiliary regulating converter can utilize fast, low-breakdown semiconductor switches that enable fast operation and regulation. By making the apparent input resistance of the auxiliary converter higher than the ESR of the switched-capacitor and the SC circuit semiconductor switch resistances, a majority of the capacitor-charging energy can be recovered. Both of these embodiments allow for a sub 1 V dc output with high-bandwidth control of the output.

Thus, described herein are two embodiments, each of which takes advantage of both switched capacitor and magnetics-based switching regulator technology. The first embodiment combines a high efficiency reconfigurable switched capacitor transformation stage with a high frequency, low-voltage regulation stage. This type of architecture will achieve its highest integration when implemented in a multiple voltage monolithic process, such as an extended drain process. The devices in the switched capacitor network need not block the full supply voltage, and depending upon the configuration, they need to block different fractions of the supply voltage. Similarly, high speed low voltage devices can be used in the switching regulator since it only sees a voltage slightly above the output voltage. Thus, the efficiency of the full converter can be optimized by using different voltage devices.

The second embodiment tightly couples a switched capacitor circuit with an auxiliary high-frequency converter (e.g. a low-voltage magnetics based converter). The high-frequency switching converter runs at a switching frequency far higher than that of the switched-capacitor circuit and recovers the energy that is normally dissipated in parasitic resistances when charging and/or discharging the capacitors. The high-frequency switched converter can also provide high-bandwidth regulation of the converter system output. The circuit can be configured such that the difference between the input voltage and the sum of the charging capacitor voltages appears across the input terminals of the fast switching converter. Because this voltage is substantially lower than the switched-capacitor circuit input voltage, the auxiliary regulating converter can utilize fast, low-breakdown semiconductor switches that enable fast operation and regulation. By making the apparent input resistance of the auxiliary converter higher than the equivalent series resistance (ESR) of the switched-capacitor and the SC circuit semiconductor switch resistances, a majority of the energy usually lost in capacitor-charging can be recovered. Both of these embodiments allow for a sub 1 V dc output with high-bandwidth control of the output.

In accordance with a still further aspect of the concepts described herein, an integrated CMOS circuit includes a reconfigurable switched capacitor transformation stage having a transformation stage input port and a transformation stage output port and comprising one or more CMOS switches and one or more discrete or integrated storage elements, said transformation stage configured to accept an input voltage at the transformation stage input port and provide an intermediate voltage at the transformation stage output port; and a regulation stage having a regulation stage input port and a regulation stage output port and comprising one or more CMOS switches implemented as base transistors of a CMOS process and one or more discrete or integrated storage elements, said regulation stage configured to accept the intermediate voltage provided by said reconfigurable switched capacitor transformation stage and configured to provide an output voltage at the regulation stage output port. In a preferred embodiment, the switches in said CMOS reconfigurable switched capacitor transformation stage and said CMOS regulation stage are provided in a single CMOS process. It should be appreciated that in some embodiments, storage elements (e.g. capacitors) in one or both of the reconfigurable switched capacitor transformation stage and/or the regulation stage may not be integrated onto the integrated circuit while in other embodiments, the storage elements in one or both of the reconfigurable switched capacitor transformation stage and the regulation stage may be integrated onto the integrated circuit along with the switches.

In accordance with a still further aspect of the concepts described herein a power converter circuit includes a switched capacitor circuit having a switched-capacitor input port and a switched capacitor output port, said switched-capacitor circuit comprising a plurality of switches and one or more capacitors, said switched-capacitor circuit switching the capacitors between at least two states to transfer energy from the switched-capacitor input port to the switched-capacitor output port, and an auxiliary converter stage coupled to said switched capacitor circuit wherein said auxiliary converter stage switches at a switching frequency higher than that of said switched-capacitor circuit such that said auxiliary converter recovers energy normally dissipated when charging or discharging capacitors of said switched capacitor circuit.

In one embodiment, the auxiliary converter recovers energy normally dissipated when charging capacitors in said switched capacitor circuit by absorbing an instantaneous difference between stacked capacitor voltages in said switched capacitor circuit and an input voltage or an output voltage of the power converter circuit.

In one embodiment, the auxiliary converter stage comprises a plurality of switches, and one or more magnetic energy storage components and the regulation stage switches at a frequency which is at least five times that of the switching frequency of the switched capacitor circuit.

In one embodiment, the switched capacitor circuit and said auxiliary circuits are provided as CMOS circuits. In a preferred embodiment, the switches in the CMOS switched capacitor circuit and CMOS auxiliary circuits are provided in a single integrated process. In a preferred embodiment, the switches in the CMOS auxiliary circuits are implemented with base transistors of a CMOS process.

BRIEF DESCRIPTION OF THE DRAWINGS

The foregoing features of the circuits and techniques described herein, may be more fully understood from the following description of the drawings in which:

FIG. 3A is a schematic diagram of a switched-capacitor circuit operating at a conversion ratio of one-third (⅓);

FIG. 3B is a schematic diagram of a switched-capacitor circuit operating at a conversion ratio of one-half (½);

FIG. 5 is a schematic diagram illustrating charging of a capacitor with resistive power loss;

FIG. 5A is a schematic diagram illustrating charging of a capacitor with energy recovery by auxiliary converter;

FIG. 6 is a schematic diagram of a power converter circuit which includes a switched-capacitor converter stage coupled to a regulating converter stage;

DETAILED DESCRIPTION OF THE PREFERRED EMBODIMENTS

Before describing several exemplary embodiments of power converter circuits and processing performed by and on such power converter circuits, it should be appreciated that, in an effort to promote clarity in explaining the concepts, reference is sometimes made herein to specific switched capacitor circuits or specific switched capacitor circuit topologies. It should be understood that such references are merely exemplary and should not be construed as limiting. After reading the description provided herein, one of ordinary skill in the art will understand how to apply the concepts described herein to provide specific switched capacitor (SC) circuits or specific switched capacitor circuit topologies. For example, while series-parallel SC topologies may be disclosed herein, such disclosure is provided to promote clarity in the description of the general concepts described herein. After reading the disclosure provided herein those of ordinary skill in the art will appreciate that a series-parallel SC topology is only one of many possible topologies. It should thus be understood that although specific switched capacitor circuits or specific switched capacitor circuit topologies are not specifically disclosed herein, such circuits still fall within the scope of the concepts claimed herein.

It should be appreciated that reference is also sometimes made herein to particular input, output and/or intermediate voltages and/or voltage ranges as well as to particular transformation values and or ranges of transformation values. It should be understood that such references are merely exemplary and should not be construed as limiting.

Reference is also sometimes made herein to particular applications. Such references are intended merely as exemplary should not be taken as limiting the concepts described herein to that particular application.

Reference is also sometimes made herein to circuits having switches or capacitors. Its should be appreciated that any switching elements or storage elements having appropriate electrical characteristics (e.g. appropriate switching or storage characteristics) may, of course, also be used.

Thus, although the description provided herein below explains the inventive concepts in the context of a particular circuit or a particular application or a particular voltage or voltage range, those of ordinary skill in the art will appreciate that the concepts equally apply to other circuits or applications or voltages or voltage ranges.

Figure 1:
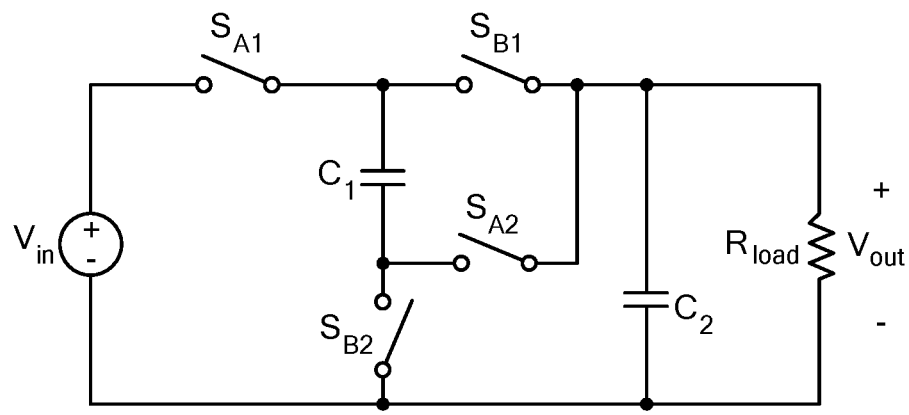
FIG. 1 is a schematic diagram of a prior art switched-capacitor circuit.
Figure 1A:
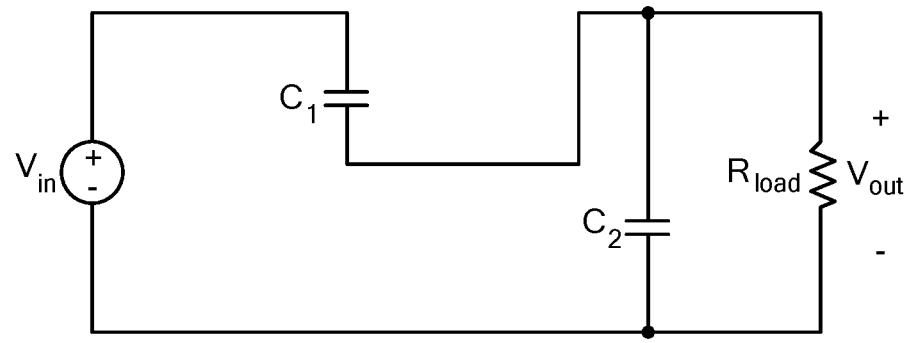
FIG. 1A is a schematic diagram of a prior art switched-capacitor circuit in a first state with capacitors charging in series.
Figure 1B:
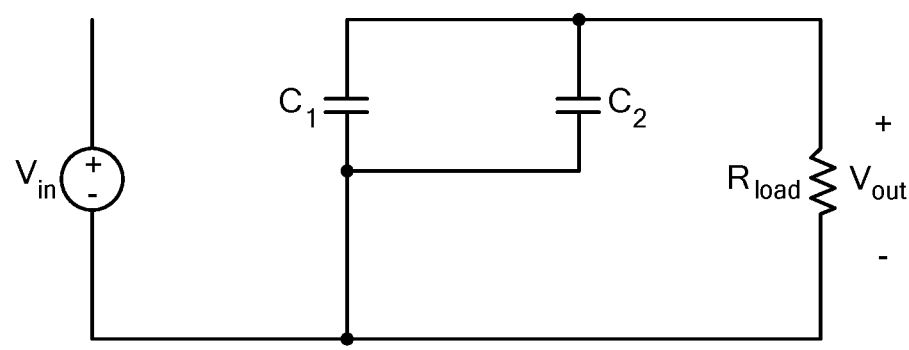
FIG. 1B is a schematic diagram of a prior art switched-capacitor circuit in a second state with capacitors discharging in parallel.
Figure 2:
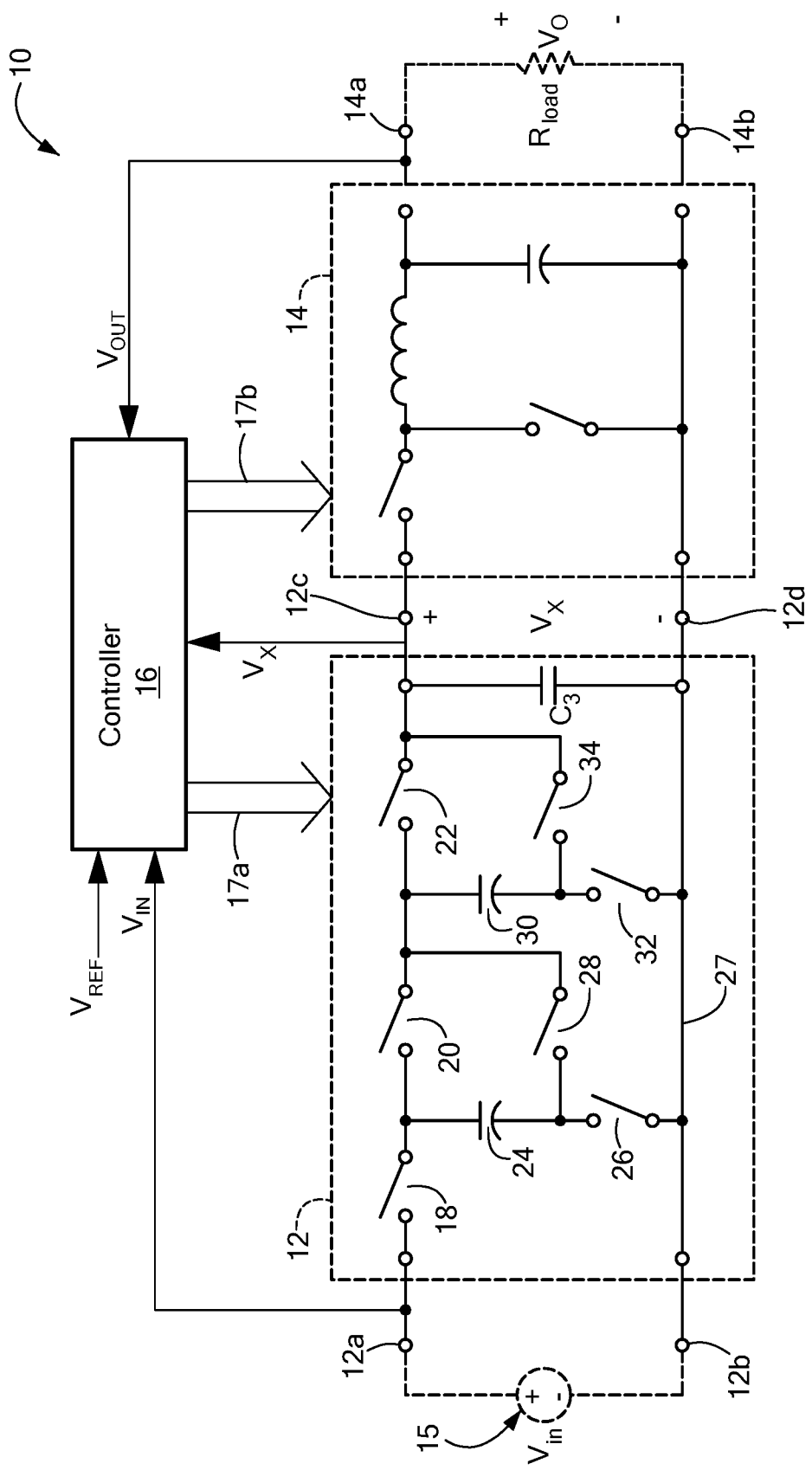
FIG. 2 is a block diagram of a converter having a transformation stage and a regulation stage.

Referring now to FIG. 2, a power converter circuit 10 includes a first stage 12 (also referred to as a "reconfigurable switched capacitor transformation stage" or a "switched capacitor stage" or more simply a "transformation stage") and a second stage 14 (also referred to as switching converter regulation stage or more simply a "regulation stage"). A voltage source 15 (here shown in phantom since it is not properly a part of the power converter circuit 10) is coupled between a pair of input terminals 12a, 12b of the transformation stage of power converter circuit 10 and a load $R_L$ (also shown in phantom since it is not properly a part of the power converter circuit 10) coupled to output terminals 14a, 14b of regulation stage 14 and across which is generated an output voltage $V_O$. A controller circuit 16 is coupled to receive a reference voltage $V_{REF}$, as well as some or all of the input and output voltages $V_{IN}$ and/or $V_{OUT}$ and an intermediate output voltage $V_x$ (or more simply, intermediate voltage $V_x$). Controller 16 receives signals provided thereto (e.g. any or all of $V_{IN}$, $V_{OUT}$ and/or intermediate voltage $V_x$) and in response thereto (and in accordance with a desired operating mode) provides control signals on paths 17a, 17b to either or both of the transformation and regulation stages 12, 14, respectively.

Transformation stage 12 receives the input voltage (e.g. $V_{IN}$) and operates to provide a transformed or intermediate voltage $V_x$ at terminals 12C-12D. Thus transformed voltage $V_x$ is provided to input terminals of regulation stage 14.

It should be appreciated that the input voltage $V_{IN}$ may vary over a relatively wide voltage range. The particular voltage range over which the input voltage may vary depends upon the particular application. For example, in some applications the range of input voltages may be from about 1.5 volts (V) to about 5.0V. In other applications the range of input voltages may be from about 6V to about 12V. In still other applications the input voltage range may be from about 10V to about 14V. For example, in a converter circuit for battery-powered portable electronics applications, operation may be typically be required across an input voltage range from 2.4 V to 5.5 V.

Regardless of the input voltage, however, the transformation stage 12, maintains transformed voltage $V_X$ over a voltage range which is relatively narrow compared with the input voltage range. For example, in the case where the input voltage range is from about 1.5 volts (V) to about 5.0V, the output voltage of the transformation stage 12 may range from about 1.0V to about 1.66V. Furthermore, the transformation ratios utilized by the transformation stage 12 are selected as a function of the input voltage $V_{IN}$. For example, the conversion ratio of the transformation stage may be dynamically selected from among the allowed set of conversion ratios such that the intermediate voltage $V_x$ will be as large as possible while remaining below a specified maximum voltage. Thus, by adjusting a transformation ratio, transformation stage 12 can accept a wide range of input voltages while maintaining the transformed voltage over a voltage range which is relatively narrow compared with the input voltage range. For example, consider a transformation stage an input voltage range of 1.5 to 5.0 V and having allowed conversion ratios of ⅓, ½, and ⅔. It is possible to meet a goal of maximizing an intermediate voltage while at the same time keeping it below a specified maximum of approximately 1.66 V by operating at a conversion ratio of ⅔ for input voltages from 1.5 V to 2.5 V, operating at a conversion ratio of one half for input voltages from 2.5 V to 3.33 V, and operating at a conversion ratio of ⅓ for input voltages from 3.33 V to 5 V.

The transformation stage 12 and regulation stage 14 each include one or more switch components and one or more energy storage components. The components which provide the transformation stage 12 are selected such that the transformation stage has a switching frequency which is relatively low compared with the switching frequency of the regulation stage. Thus, the transformation stage may be referred to a low frequency stage while the regulation stage may be referred to as a high frequency, low voltage magnetic stage. The difference in switching speeds of the transformation stage and regulation stage switches (i.e. the frequency separation between the switching frequencies of the switches) is selected based upon a variety of factors including but not limited to the gating and switching loss characteristics of the switches It should, of course, be appreciated that a tradeoff must be made between switching frequency and the voltage levels (and/or range of voltages) which must be accepted by and provided by the transformation and regulation stages.

Transformation stage 12 includes a first plurality of coupled switches 18, 20, 22 coupled between terminal 12a and a terminal 12c.

A first capacitor 24 has a first terminal coupled to a first terminal of switch 18 and a second terminal coupled to a first terminal of a switch 26. A second terminal of switch 26 is coupled to an interconnect path 27 coupled between terminal 12b and a terminal 12d. In this particular embodiment, interconnect path 27 is coupled to a negative terminal of the voltage source 16.

A first terminal of a switch 28 is coupled to the second terminal of capacitor 24 and a second terminal of switch 28 is coupled to a node between switches 20 and 22.

A second capacitor 30 has a first terminal coupled to a first terminal of switch 22 and a second terminal coupled to a first terminal of a switch 32. A second terminal of switch 32 is coupled to the interconnect path coupled between terminal 12b and terminal 12d.

A first terminal of a switch 34 is coupled to the second terminal of capacitor 30 and a second terminal of switch 34 is coupled to a second terminal of switch 22. Thus, by proper operation of switches 18, 20, 22, 26, 28, 32 and 34, capacitors 24 and 30 may be selectively coupled in parallel between terminals 12c and 12d. Alternatively, by proper operation of switches 18, 20, 22, 26, 28, 32 and 34, capacitors 24 and 30 may be selectively coupled in parallel with switches 20, 22, respectively, creating a series stack between terminal 12a and terminal 12c.

It should, of course, be appreciated that the above-described operating mode is merely one of a plurality of different possible operating modes in a reconfigurable circuit. Another exemplary operating mode (or circuit configuration) is illustrated in FIG. 3B. The system dynamically selects between a plurality of possible patterns and thus is said to be dynamically reconfigurable.

The transformation stage 12 corresponds to a reconfigurable switched capacitor converter. By appropriately selecting the switching patterns of the switches from among the possible patterns, the switched capacitor converter is reconfigurable and thus is able to provide efficient power conversion at multiple distinct conversion ratios. The operating mode of the transformation stage 12 is controlled as a function of input voltage. For example, for large input voltages one can operate the circuit to follow the switching patterns in FIG. 3A, providing 3:1 conversion, while for lower input voltages one can operate the circuit to follow the switching patterns of FIG. 3b, thus providing 2:1 conversion. In this way, transformation stage 12 can efficiently provide an intermediate voltage $V_x$ between terminals 12c, 12d that is smaller than the input voltage $V_{IN}$ and which varies over a much smaller range (ratio) than the input voltage $V_{IN}$.

The second, or regulating, stage 14 corresponds to a magnetic-based switching power converter which operates from the low, narrow-range (i.e. any range less than the input voltage range; for example, if the ratio of $V_{IN}/V_O$ equals 2:1 then anything less than that would be considered narrow-range) intermediate voltage to regulate the output voltage $V_o$. As this stage operates from a relatively low, narrow input voltage range, it can be designed to operate at relatively high frequencies. Since component size is related to switching frequency (e.g. the higher the switching frequency, the smaller the component), the circuit may be implemented using passive components which are relatively small in size and which provide high-bandwidth regulation of the output. Thus, power converter 10 converts power in two stages (i.e. the transformation stage 12 and the regulating stage 14) and together, the two stages can provide very small size, high efficiency, and high control bandwidth characteristics.

The transformation or switched-capacitor stage 12 is designed (e.g. by inclusion of multiple switched capacitor building blocks) to efficiently convert power at multiple distinct voltage conversion ratios. The number of capacitors in the converter stage determines both the maximum conversion ratio and the total possible number of distinct conversion ratios. It should thus be appreciated that the particular number of switches and capacitors included in the transformation stage depends upon a variety of factors including but not limited to the input voltage range for a particular application and the output voltage required for a particular application, and how many different transformation ratios are desired to reduce the intermediate voltage range.

The power converter circuit described herein may be fabricated as an integrated circuit using a CMOS process. In this case, an integrated CMOS circuit includes a reconfigurable switched capacitor transformation stage provided from one or more CMOS switches and one or more storage elements, in which the storage elements may be realized as either integrated capacitors or external devices. The regulation stage would also be provided from one or more CMOS switches implemented and one or more storage elements. Again, the storage elements may be integrated, discrete, or provided as bond wires. In a preferred embodiment, the switches in said CMOS reconfigurable switched capacitor transformation stage and said CMOS regulation stage are fabricated in a single CMOS process. In the case where it is desirable for the switches of the regulation stage to switch at a higher frequency (in some cases a significantly higher frequency) than the switches in the transformation stage, the switches of the regulation stage may be fabricated as base transistors in the CMOS process.

Figure 3:
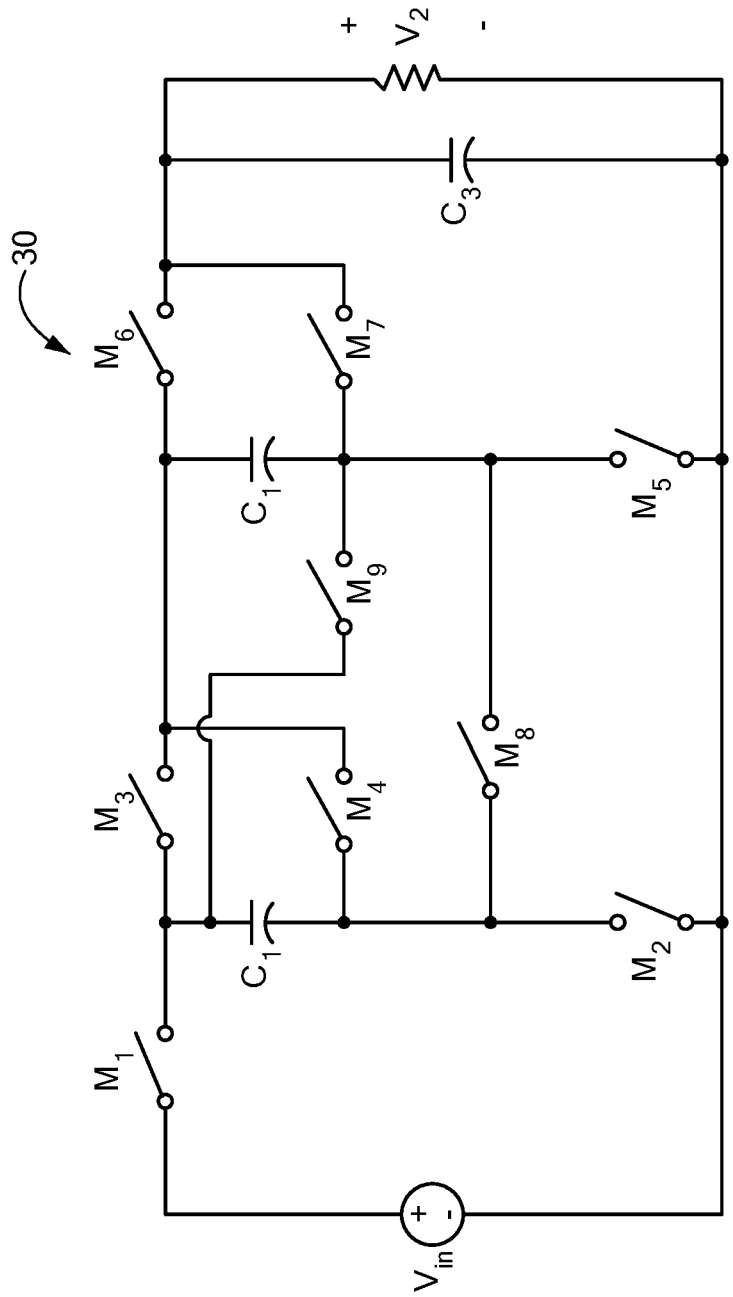
FIG. 3 is a schematic diagram of a reconfigurable switched-capacitor converter having a plurality of capacitors.
Figure 3C:
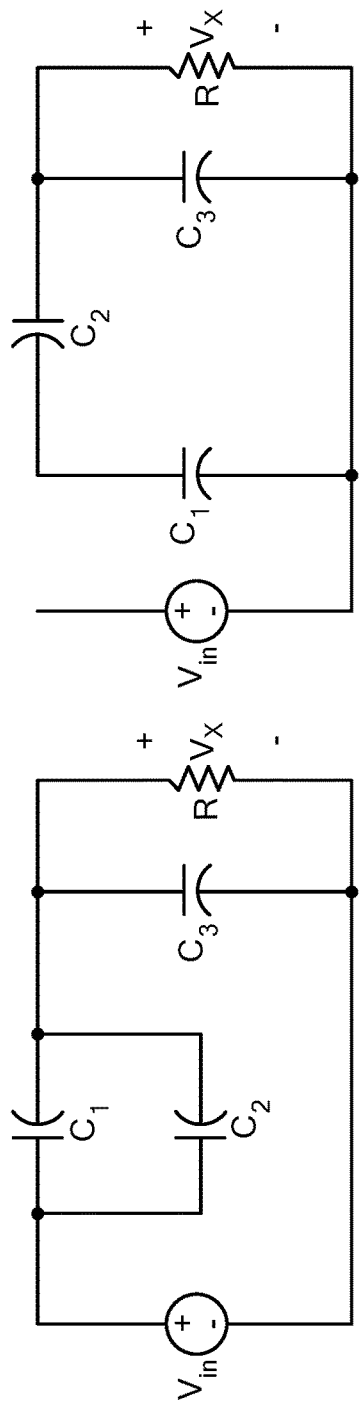
FIG. 3C is a schematic diagram of a switched-capacitor circuit operating at a conversion ratio of two-thirds (⅔)

Referring now to FIGS. 3-3C in which like elements are provided having like reference designations, a transformation stage 30 (also referred to as a switched capacitor stage) includes eight switches M1-M8 and three capacitors C1-C3. The switches may be selectively opened and closed as shown in Table 1 below to provide three distinct conversion ratios (in this case, step-down ratios) of: $1/3$; $1/2$; and $2/3$.

TABLE 1

| $V_2/V_1$ | $M_1$ | $M_2$ | $M_3$ | $M_4$ | $M_5$ | $M_6$ | $M_7$ | $M_8$ | $M_9$ |
|---|---|---|---|---|---|---|---|---|---|
| 1/3 | clk | $\overline{clk}$ | $\overline{clk}$ | clk | $\overline{clk}$ | $\overline{clk}$ | clk | off | off |
| 1/2 | clk | $\overline{clk}$ | $\overline{clk}$ | clk | on | on | off | off | off |
| 2/3 | clk | $\overline{clk}$ | clk | off | off | $\overline{clk}$ | clk | clk | $\overline{clk}$ |
| $V_{max}$ | $2/3V_1$ | $2/3V_1$ | $1/2V_1$ | $1/2V_1$ | $2/3V_1$ | $1/3V_1$ | $1/2V_1$ | $1/2V_1$ | $1/2V_1$ |

The SC transformation stage is provided with a digital clock signal clk. A second signal /clk is also generated, which may simply be the complement of clk (i.e., is high when clk is low and low when clk is high), or which may be generated as a non-overlapping complement as is well known in the art. The elements of the first three rows of table 1 indicate the switching states of the individual switches as the circuit is clocked. Each row shows operation for a different conversion ratio (i.e., operating configuration). An entry clk indicates that the switch is on (closed) when clk is asserted and off (open) otherwise, an entry /clk indicates that the switch is on when the complementary signal /clk is asserted and off otherwise, an entry off indicates that the switch is always off for that conversion ratio, and an entry on indicates that a switch is always on for that conversion ratio.

Referring now to FIG. 3A, with a switching pattern set in accordance with the second row of Table 1, the switched-capacitor circuit 30 provides a step down ratio of one-third ($1/3$).

Referring now to FIG. 3B, with a switching pattern set in accordance with the third row of Table 1, the switched-capacitor circuit 30 provides a step down ratio of one-half ($1/2$).

Referring now to FIG. 3C, with a switching pattern set in accordance with the third row of Table 1, the switched-capacitor circuit 30 provides a step down ratio of two-thirds ($2/3$).

It should be appreciated that the maximum voltage to which any of the devices in transformation stage 30 will be exposed is $2/3$ of the input voltage ($V_1$) and some of the devices may see less ($1/2V_1$ and $1/3V_1$) depending upon a selected operating mode. It should be appreciated that all of the devices in transformation stage 30 must be able to block the required voltage to realize all three step-down ratios. For example, $M_1$ must be rated to block $2/3$ however it only sees $1/2V_1$ for a step-down ratio of $1/2$ and $2/3\ V_1$ for step-down ratios of $1/3$ and $2/3$. If more complicated networks are used (i.e. more switches), it may be possible to realize the same functionality at higher efficiency, but at the cost of area.

The switched capacitor stage 30 is thus controlled to maintain the intermediate voltage $V_x$ within a specified (narrow) range (or window) of voltages as the input voltage varies across a wide range of voltages. The size, maximum voltage and minimum voltage of the output window of the SC transformation stage can be tailored to fit the regulation stage.

Figure 4:
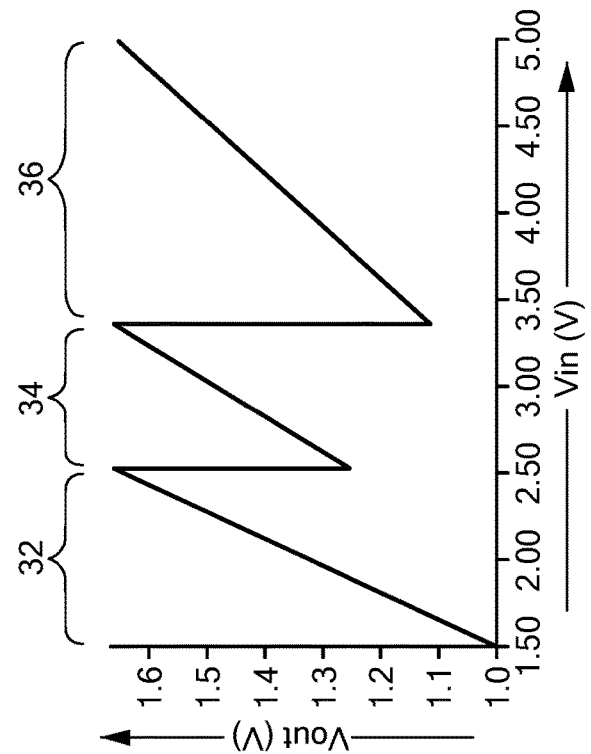
FIG. 4 is a plot of output voltage vs. input voltage of an SC converter having three distinct step-down ratios (⅓, ½, ⅔) and a predetermined maximum output voltage.

Referring now to FIG. 4, one possible windowing scheme for transformation stage 30 (a/k/a switched capacitor stage 30) of FIG. 3 is shown. Transformation stage 30 can accept an input voltage in the range of about 1.5V to about 5.0V (3.33:1) and convert it into window of about 0.66 V ranging from about 1V to about 1.66V. Various control schemes can be used to accomplish this task. That is, the particular manner in which switches in transformation stage 30 (FIG. 3) are selectively opened and closed to provided a desired transformation ratio may be selected based upon a variety of factors including but not limited to how charge flows in the circuit and how much loss is generated by a particular pattern.

As is understood in the art, the circuit topology and switching patterns are selected such that charge balance is maintained on the charge storage elements (e.g. capacitors), which imposes a rational conversion ratio between the input and the output charge (and current) for a given switching pattern. This conversion ratio is the inverse of the ideal voltage conversion ratio of the circuit for a given switching pattern. In region 32, a transformation ratio of $2/3$ is used while in region 34 a transformation ratio of $1/2$ is used while in region 36 a transformation ration of $1/3$ is used. It should be appreciated that the waveform of FIG. 4 is selected strictly on $V_{IN}$, but it should be appreciated that the selection could be made based upon both $V_{IN}$ and $V_{OUT}$. For example, one might select the switching pattern transitions and hence the intermediate voltage window so that the regulation stage can operate near a desired conversion ratio, maximizing efficiency.

The regulating stage can be implemented with numerous topologies for very low output voltages (e.g. sub 1 V); good options include a synchronous buck converter, cascode-switch synchronous buck converter, interleaved synchronous buck converter, three-level synchronous buck converter, and four-switch "buck-boost" converter. Very fast transistors, such as base CMOS transistors in an integrated process, can be used in the regulation stage since the input voltage is quite low. This allows the regulation stage to operate at a very high switching frequency, which in turn reduces the size of its passive components.

One option to achieve a very high degree of integration is to fabricate the converter in a multiple-voltage monolithic process (e.g., a process providing for extended drain transistors). The switched capacitor stage can be implemented with higher voltage devices and operated at a relatively low frequency (e.g., 1 MHz) commensurate with the high-voltage devices. The regulating stage can be implemented with low-voltage devices, and thus can be operated at considerably higher frequencies (e.g., 100 MHz), providing small volume for the passive components and fast regulation. Alternatively, multi-chip fabrication can be used in which the two stages are implemented in different processes, each optimized for their respective functions.

A converter with a large input voltage range and output current range can thus be realized if a reconfigurable switched capacitor converter with multiple transformation ratios is used as a transformation stage along with a high frequency, low voltage regulation stage. The converter can also take advantage of state-of-the-art CMOS processes that have additional high voltage devices.

The energy loss $E_L$ associated with charging a capacitor C from zero to a voltage V with a series connection from a dc voltage source of value V is $\frac{1}{2} CV^2$, and is independent of the parasitic series resistance (R). Furthermore, for a conventional SC circuit, a fixed amount of charge-up energy loss equal to $\frac{1}{2} C\Delta^2$ will result at each switch interval, where $\Delta V$ corresponds to the difference between the initial and final value of the capacitor voltage. It is important to note that this fixed charge-up loss cannot be reduced by employing switches with lower on-state resistance. It is for this reason that conventional SC converters aim to minimize the variations of the voltage on the capacitors during the charging phase and only operate efficiently at certain conversion ratios. Consequently, conventional SC converters require relatively large capacitors to achieve high efficiency and power levels and do not provide efficient regulation from variable input voltages. As is shown below, a second embodiment of a power converter circuit permits more efficient use of the capacitors, enabling reduction in the required capacitor size and/or improvement in system efficiency. Furthermore, the second embodiment does not require a reconfigurable switched-capacitor network although it may use one.

To understand the approach used in the second embodiment, consider the circuit of FIG. 5 which is a simple example, which illustrates the loss-mechanism for charging of the capacitors in the switched capacitor stage. FIG. 5 is used to explain an example of the charging process of a capacitor C, where a resistor R represents the combined equivalent series resistance (ESR) of the capacitor and switch on-state resistance. The capacitor has an initial charge of $V_i$, and the switch is closed at $t=0^+$ After $t=0^+$, the difference between voltage $V_{in}$ and the capacitor at each instance in time appears across the parasitic resistor R resulting in dissipation during charging. If charging is allowed to continue for a sufficient period of time, the voltage across the capacitor will charge up to $V_{in}$, and the voltage across the resistor will become 0 V. The voltage across the resistor and the current through it, results in a power loss during the charging phase of the capacitor, which depends on the capacitance and the net charge in the capacitor. It is this loss which limits the efficiency of the switched capacitor stage.

FIG. 5A illustrates a technique to improve the charge-up efficiency of the switched capacitor circuit. In this embodiment, an auxiliary converter 40 operating at a much faster switching frequency than the switched capacitor stage is used to reduce the energy loss of the switched capacitor circuit. The switching frequency of the auxiliary converter should be sufficiently higher than the switched capacitor stage such that the capacitor charging takes place over many switching cycles of the auxiliary converter. A factor of five in switching frequency may be sufficient for this purpose, and factors of ten or more are typical.

The auxiliary converter 40 may be the regulating converter used to supply the output, or it may be a separate converter. The system is designed such that the majority of the difference between the input voltage $V_{in}$ and the capacitor stack voltage $V_c$ appears across the input of the auxiliary converter when the capacitor is charging. Instead of being dissipated as heat in the resistor, the energy associated with charging the capacitor stack is delivered to the output of the auxiliary converter.

FIG. 6 illustrates a possible implementation of the general embodiment discussed above in conjunction with FIG. 5.

Referring now to FIG. 6, a power converter 50 includes a transformation stage 52 and an auxiliary converter and the regulating converter stage 54. Transformation stage 52 includes a plurality of capacitors C1, C2 and a first group of switches (each labeled S1) and a second group of switches (each labeled S2). Auxiliary converter and the regulating converter stage 54 includes a plurality of capacitors $C_{small}$, $C_{buck}$, a plurality of switches S3, S4 and an inductive element $L_{buck}$.

In the exemplary embodiment shown in FIG. 6, a "fast regulating converter" (in this case a synchronous buck converter) serves as both the auxiliary converter and the regulating converter stage 54 for the system 50. Auxiliary converter and the regulating converter stage 54 operates at a switching frequency much higher than that of the switched capacitor stage 52. As the capacitor $C_{small}$ serves only as a filter and bypass for the fast regulating converter, its numerical value can be much smaller than the capacitors $C_1$ and $C_2$ of the switched capacitor transformation stage. When the switched-capacitor stage is configured for charging of $C_1$ and $C_2$ (switches S1 closed), the difference between $V_{in}$ and the sum of the voltages across capacitors $C_1$ and $C_2$ appears across the input terminal of the fast regulating converter. $C_1$ and $C_2$ thus charge with low loss, and at a rate determined by the power drawn from the regulating converter to control the system output. Likewise, when the switched-capacitor stage is configured for discharging $C_1$ and $C_2$ in parallel (switches S2 closed), the discharge is at a rate based on the power needed to regulate the output.

In operating the system, the switched capacitor stage 52 can be switched (switch sets S1 and S2 on alternately) such that the voltage $V_x$ at the input of the fast regulating converter stays within a specified window or below a specified voltage. For example, the switches could be controlled such that the capacitor $C_1$ and $C_2$ voltages remain within a specified hysteresis band about $V_{in}/3$, such that the regulating converter sees a maximum input voltage near $V_{in}/3$. Alternatively, the switched capacitor stage can be controlled to provide a specified maximum voltage $V_x$ at the input of the auxiliary converter.

Figure 7:
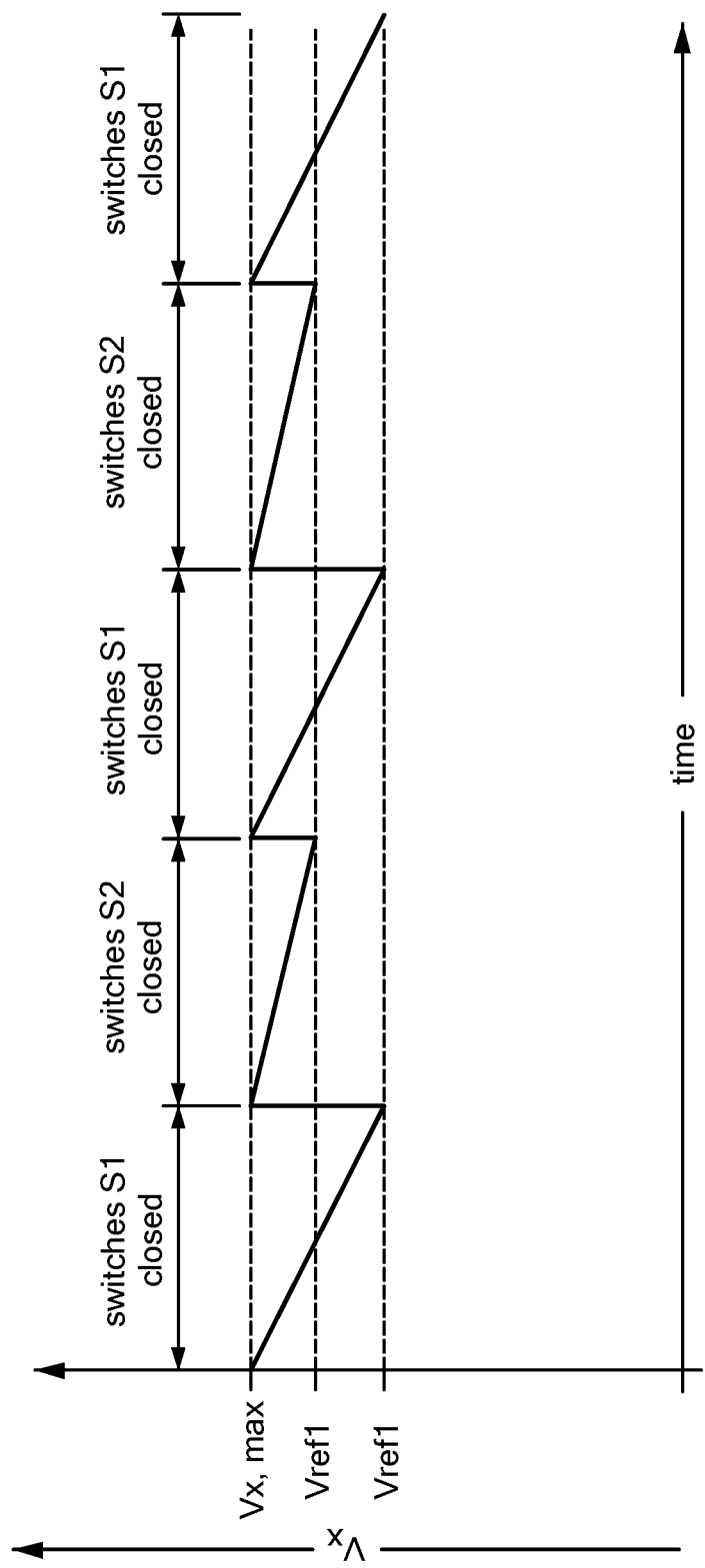
FIG. 7 is a plot of switch configuration vs. voltage.

Referring now to FIG. 7, a plot of switch configuration vs. voltage illustrates a control strategy utilizing the above-described technique, where two separate reference voltages are used to ensure that the input voltage of the auxiliary converter does not exceed $V_{X,max}$. In this example, the switches designated by reference number 1 in FIG. 6 are on or closed (series charging of the capacitors) until $V_X$ falls below $V_{ref1}$. At this time, switches 1 turn off or open, and the switches designated with reference numeral 2 turn on (parallel discharging of capacitors), until $V_X$ falls below $V_{ref2}$, at which time the cycle repeats. The reference voltages are set by the maximum auxiliary input voltage $V_{X,max}$, and are given by:

$$V_{ref1} = V_{IN} = 2V_{X,max}$$

$$V_{ref2} = \frac{V_{in} - V_{X,max}}{2}$$

It should be understood that the topology of the fast regulating converter (a buck converter in the example of FIG. 6) can be any type of power converter that is able to provide fast switching and efficient regulation of the output voltage for various input voltages (synchronous buck, three-level synchronous buck, SEPIC, soft switched or resonant converter, etc.). Similarly, the switched-capacitor circuit can be realized with a variety of topologies, depending on desired voltage transformation and permitted switch voltages.

Figure 8:
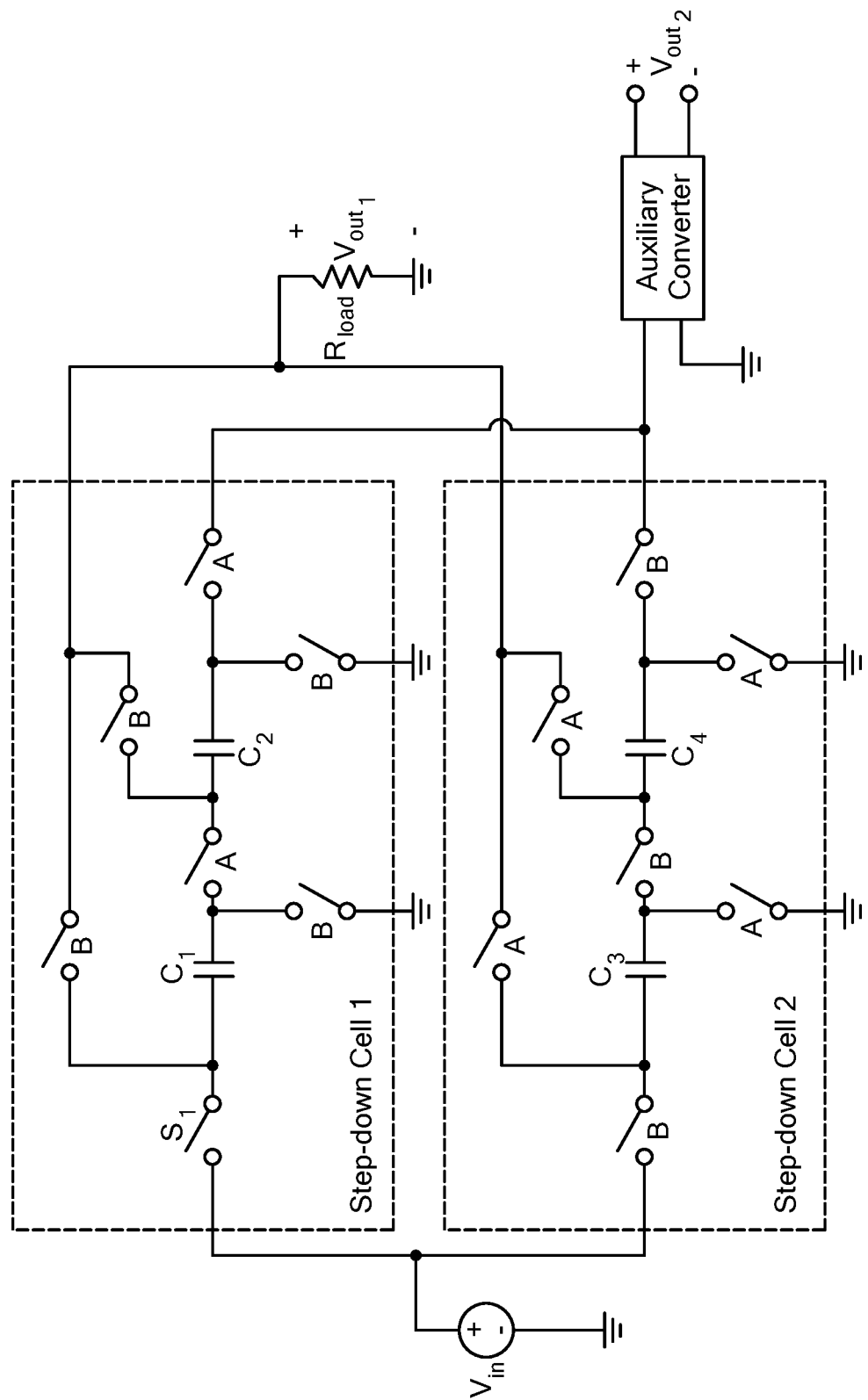
FIG. 8 is a schematic diagram of a power converter circuit which includes a switched-capacitor converter stage coupled to a regulating auxiliary converter stage which provides a separate output voltage.

Referring now to FIG. 8, yet another embodiment of a power converter circuit is shown. The circuit topology shown in FIG. 8 illustrates how the auxiliary converter can be used as a separate energy-recovering device, with an independent output voltage. In this embodiment, two parallel switched-capacitor circuits are employed, operating in anti-phase. When the capacitors of step-down cell 1 are charging in series (switches A closed, switches B open), the capacitors of cell 2 are discharging in parallel. The difference between the input voltage and the sum of the charging capacitors appears across the input terminal of the auxiliary converter. The charging energy can again be recovered by this auxiliary converter, providing a means for improving overall efficiency or increasing power density. It is important to note that the output voltage of the switched-capacitor stage, $V_{out1}$, can be regulated using the auxiliary converter. The auxiliary converter performs the regulating functions in a manner similar to some (lossy) current-controlled strategies. The auxiliary converter can again be any type of fast regulating converter, just as in the example of FIG. 6. The regulated output voltage $V_{out2}$ can be higher or lower than $V_{out1}$, depending on the choice of auxiliary converter. This voltage can be used for a variety of purposes. Examples include, but are not limited to: powering the SC transistors, fed back to the input, delivered to the output, or providing a separate output voltage for applications where that is desirable. $R_{load}$ in this circuit can represent the actual load, or may represent the input impedance of another converter or set of converters for regulating system outputs.

Having described one or more preferred embodiments of the circuits, techniques and concepts described herein, it will now become apparent to those of ordinary skill in the art that other embodiments incorporating these circuits, techniques and concepts may be used. Accordingly, it is submitted that that the scope of the patent should not be limited to the described embodiments, but rather, should be limited only by the spirit and scope of the appended claims.

What is claimed is:

1. A voltage regulator configured to receive a first voltage signal at an input thereof and generate a second voltage signal at an output thereof with the second voltage signal based, at least in part, on the first voltage signal, the voltage regulator comprising:
   a switched magnetic stage comprising:
      an input terminal corresponding to the input of the voltage regulator, the switched magnetic stage input terminal configured to receive the first voltage signal;
      a magnetic storage element; and
      an output terminal;
      the switched magnetic stage configured to provide a first output voltage signal at the output terminal based, at least in part, on the first voltage signal received at the input terminal; and
   a switched capacitor converter comprising:
      at least one input terminal; and
      an output terminal, wherein the switched capacitor converter is configured to receive, at the at least one input terminal, an input voltage signal for a portion of a time period, and to provide a second output voltage signal at the switched capacitor converter output terminal based, at least in part, on the received input voltage signal,
   wherein the second voltage signal is based, at least in part, on the first output voltage signal and the second output voltage signal.

2. The voltage regulator of claim 1 wherein the switched magnetic stage further comprises:
   a plurality of switches; and
   a plurality of magnetic energy storage components.

3. The voltage regulator of claim 1 wherein the magnetic storage element of the switched magnetic stage is configured to recover energy normally dissipated in capacitors of the switched capacitor transformation stage.

4. A power converter circuit comprising:
   a reconfigurable switched capacitor transformation stage having a transformation stage input port and a transformation stage output port and comprising one or more capacitive storage elements, the reconfigurable switched capacitor transformation stage configured to accept an input voltage at the transformation stage input port and provide an intermediate voltage at the transformation stage output port; and
   a regulation stage having a regulation stage input port and a regulation stage output port and comprising a plurality of switches and one or more magnetic storage elements, the regulation stage configured to accept the intermediate voltage provided by the reconfigurable switched capacitor transformation stage and configured to provide an output voltage at the regulation stage output port and wherein the plurality of switches in the regulation stage operate at a switching frequency which is different than a switching frequency of the plurality of switches in the reconfigurable switched capacitor transformation stage.

5. The power converter circuit of claim 4 wherein:
   the plurality of switches in the regulation stage operate at a switching frequency which is higher than the switching frequency of the plurality of switches in the reconfigurable switched capacitor transformation stage.

6. An integrated circuit comprising:
   a reconfigurable switched capacitor transformation stage having a transformation stage input port and a transformation stage output port and comprising a plurality of integrated switches and interconnections to one or more storage elements, the reconfigurable switched capacitor transformation stage configured to accept an input voltage at the transformation stage input port and provide an intermediate output voltage at the transformation stage output port; and
   a regulation stage having a regulation stage input port and a regulation stage output port and comprising a plurality of integrated switches implemented as base transistors of a CMOS process and interconnections to one or more storage elements, the regulation stage configured to accept the intermediate output voltage provided by the reconfigurable switched capacitor transformation stage and configured to provide an output voltage at the regulation stage output port.

7. The integrated circuit of claim 6 wherein the plurality of integrated switches in the reconfigurable switched capacitor transformation stage and the regulation stage are provided in a single CMOS process.

8. The integrated circuit of claim 7 wherein:
the regulation stage is provided as a switched magnetic regulation stage comprising:
an input terminal corresponding to an input of a voltage regulator, the switched magnetic stage input terminal configured to receive a first voltage signal;
a magnetic storage element; and
an output terminal; and
the switched magnetic regulation stage is configured to provide a first output voltage signal at the output terminal based, at least in part, on the first voltage signal received at the switched magnetic stage input terminal.

9. The integrated circuit of claim 8 wherein:
the reconfigurable switched capacitor transformation stage is provided as a switched capacitor converter comprising:
at least one input terminal; and
an output terminal, wherein the switched capacitor converter is configured to receive, at the at least one input terminal, an input voltage signal for a portion of a time period, and to provide a second output voltage signal at the switched capacitor converter output terminal based, at least in part, on the received input voltage signal,
wherein the second voltage signal is based, at least in part, on the first output voltage signal and the second output voltage signal.

10. The integrated circuit of claim 9 wherein the switched magnetic regulation stage further comprises:
a plurality of switches; and
a plurality of magnetic energy storage components.

11. The integrated circuit of claim 9 wherein the magnetic storage element of the switched magnetic regulation stage is configured to recover energy normally dissipated in capacitors of the reconfigurable switched capacitor transformation stage.

* * * * *